(12) United States Patent  
Soukhojak et al.

(10) Patent No.: US 9,151,545 B2
(45) Date of Patent: Oct. 6, 2015

(54) THERMAL MANAGEMENT OF AN ELECTROCHEMICAL CELL BY A COMBINATION OF HEAT TRANSFER FLUID AND PHASE CHANGE MATERIAL

(75) Inventors: Andrey N. Soukhojak, Midland, MI (US); Kalyan Sehanobish, Rochester, MI (US)

(73) Assignee: Dow Global Technologies LLC, Midland, MI (US)

(*) Notice: Subject to any disclaimer, the term of this patent is extended or adjusted under 35 U.S.C. 154(b) by 526 days.

(21) Appl. No.: 13/511,741

(22) PCT Filed: Dec. 20, 2010

(86) PCT No.: PCT/US2010/061213
§ 371 (c)(1),
(2), (4) Date: May 24, 2012

(87) PCT Pub. No.: WO2011/084728
PCT Pub. Date: Jul. 14, 2011

(65) Prior Publication Data
US 2012/0263980 A1    Oct. 18, 2012

Related U.S. Application Data

(60) Provisional application No. 61/293,229, filed on Jan. 8, 2010.

(51) Int. Cl.
*H01M 10/60* (2014.01)
*H01M 10/617* (2014.01)
(Continued)

(52) U.S. Cl.
CPC . *F28D 20/02* (2013.01); *C09K 5/04* (2013.01); *C09K 5/063* (2013.01); *C09K 5/10* (2013.01);
(Continued)

(58) Field of Classification Search
CPC .......... H01M 4/0471; H01M 8/04007; H01M 8/04074; H01M 10/60; H01M 10/617
See application file for complete search history.

(56) References Cited

U.S. PATENT DOCUMENTS

| 4,329,407 | A | 5/1982 | Gross et al. |
| 5,158,841 | A | 10/1992 | Mennicke et al. |

(Continued)

FOREIGN PATENT DOCUMENTS

| FR | 2903058 A1 | 1/2008 |
| WO | 2011/037596 A1 | 3/2011 |

OTHER PUBLICATIONS

Sharma, A., et al., "Review on thermal energy storage with phase change materials and applications", Renewable and Sustainable Energy Reviews, 13, 2009, 318-345.

(Continued)

*Primary Examiner* — Barbara Gilliam
*Assistant Examiner* — Angela Martin
(74) *Attorney, Agent, or Firm* — Kevin J. Nilsen

(57) ABSTRACT

The invention is directed at devices, systems, and processes for managing the temperature of an electrochemical call including a device 10 comprising an inlet for receiving a heat transfer fluid; one or more electrochemical cell compartments 12 for receiving one or more electrochemical calls 20; one or more thermal energy storage material compartments 14 containing one or more thermal energy storage materials 18; and one or more heat transfer fluid compartments 16 for flowing the heat transfer fluid through the device; wherein the space between the one or more heat transfer fluid compartments 16 and the one or more electrochemical cell compartments 12 preferably includes one or more first regions 22 (i.e. portion) that are substantially free of the thermal energy storage material 18; and the space between the one or more heat transfer fluid compartments 16 and the one or more thermal energy storage material compartments 14 preferably includes one or more second regions 24 (i.e. portion) that are substantially free of an electrochemical cell 20; so that the heat transfer fluid compartment 16 is in direct thermal communication with both the thermal energy storage material compartment 14 and the electrochemical cell compartment 12.

17 Claims, 8 Drawing Sheets

(51) Int. Cl.

| | |
|---|---|
| *F28D 20/02* | (2006.01) |
| *C09K 5/04* | (2006.01) |
| *C09K 5/06* | (2006.01) |
| *C09K 5/10* | (2006.01) |
| *F28D 15/00* | (2006.01) |
| *F28D 15/02* | (2006.01) |
| *F28D 20/00* | (2006.01) |
| *H01M 10/6563* | (2014.01) |
| *H01M 10/6557* | (2014.01) |
| *H01M 10/6567* | (2014.01) |
| *H01M 10/659* | (2014.01) |

(52) U.S. Cl.
CPC ............ *F28D 15/00* (2013.01); *F28D 15/0266* (2013.01); *F28D 20/00* (2013.01); *H01M 10/617* (2015.04); *H01M 10/659* (2015.04); *H01M 10/6557* (2015.04); *H01M 10/6563* (2015.04); *H01M 10/6567* (2015.04); *F28D 2020/0008* (2013.01); *Y02E 60/142* (2013.01); *Y02E 60/145* (2013.01)

(56) References Cited

U.S. PATENT DOCUMENTS

| | | |
|---|---|---|
| 5,449,571 A | 9/1995 | Longardner et al. |
| 5,731,568 A | 3/1998 | Malecek |
| 5,817,434 A | 10/1998 | Brooker et al. |
| 6,596,433 B2 | 7/2003 | Gudmundsson et al. |
| 6,797,427 B2 | 9/2004 | Maleki et al. |
| 6,889,751 B1 | 5/2005 | Lukas et al. |
| 6,942,944 B2 | 9/2005 | Al-Hallaj et al. |
| 8,091,613 B2 | 1/2012 | Bank et al. |
| 8,201,615 B2 | 6/2012 | Soukhojak et al. |
| 2008/0230203 A1 | 9/2008 | Christ et al. |
| 2009/0123815 A1 | 5/2009 | Alkemade et al. |
| 2009/0250189 A1* | 10/2009 | Soukhojak et al. ............. 165/10 |

OTHER PUBLICATIONS

Zalba, B., et al., "Review on thermal energy storage with phase change: materials, heat transfer analysis and applications", Applied Thermal Engineering, 23, 2003, 251-283.

\* cited by examiner

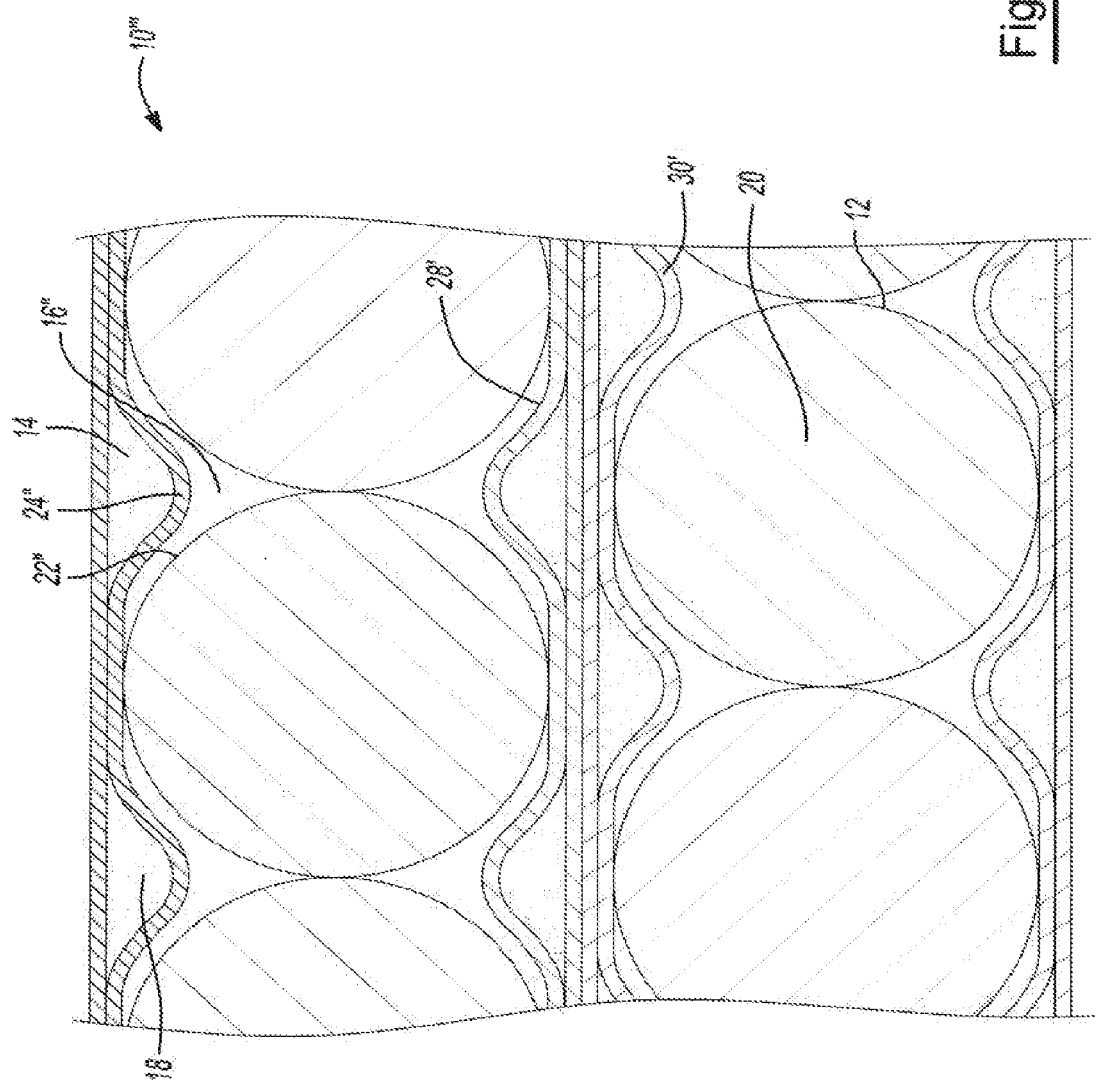

THERMAL MANAGEMENT OF AN ELECTROCHEMICAL CELL BY A COMBINATION OF HEAT TRANSFER FLUID AND PHASE CHANGE MATERIAL

CLAIM OF BENEFIT OF FILING DATE

The present application claims the benefit of the filing date of U.S. Provisional Application Ser. No. 61/293,229, filed Jan. 8, 2010, and PCT/US10/061213, filed Dec. 20, 2010, which is hereby incorporated by reference for al purposes.

FIELD OF THE INVENTION

The present invention relates to thermal management of an electrochemical cell, such as a secondary battery using a combination of a heat transfer fluid and a thermal energy storage material.

BACKGROUND OF THE INVENTION

Industry in general has been actively seeking a novel approach to partially or completely power vehicles using electricity stored in electrochemical cells. One problem which has been recognized by the automotive industry is the need to control the temperature of the electrochemical cells. The power generating capacity of an electrochemical cell is known to change with temperature, and electrochemical cells are known to fail when heated to high temperatures.

Various approaches to regulating the temperature of an electrochemical cell are described in U.S. Pat. No. 6,596,433 B2 (Godmundsson et al., issued Jul. 22, 2003), U.S. Pat. No. 5,817,434 (Brooker et al, issued Oct. 6, 1998), U.S. Pat. No. 5,449,571 (Longardner et al., issued Sep. 12, 1995), U.S. Pat. No. 6,797,427 B2 (Maleki et al., issued Aug. 9, 2001), and U.S. Pat. No. 6,942,944 B2 (Al-Hallaj et al., issued Sep. 13, 2005), each incorporated herein by reference in its entirety. Each of these approaches is inefficient in one or more aspects. For example, Godmundsson et al. (U.S. Pat. No. 6,596,433 B2) teaches a device including a compartment containing a phase change material that completely separates the electrochemical cells from a passage for flowing air. As such, the air stream cannot directly cool the electrochemical cell. Heat must first diffuse through the phase change material before it reaches the air stream. This arrangement is inefficient, particularly for dealing with applications that may require long times of high battery discharge power (such as during high speed driving or uphill driving of an automotive vehicle). Also Godmundsson does not teach a system for heating the electrochemical cells when the phase change material has cooled.

The basic idea is to be able to operate an electrochemical cell within a target temperature by providing heat when the temperature is below a minimum target temperature, removing heat when the temperature is above a maximum target temperature, and transferring heat into or out of a thermal energy storage material when the temperature of the electrochemical cell is within the target temperature range. To be a practical solution the approach to heating the electrochemical cell should employ a device that efficiently stores heat for extend periods of time (e.g., at least 4 or more hours) so that after the vehicle is parked in a cold environment the electrochemical cells can be rapidly heated to at temperature at which they can provide sufficient power to a an electric load, such as an electric motor.

There continues to exist a need for devices and systems for rapidly removing heat from an electrochemical cell, for rapidly providing heat to an electrochemical cell, for maintaining an electrochemical cell between a minimum target temperature and a maximum target temperature, to efficiently store heat, or any combination thereof. For example, there exists a need for a device that is capable of transferring heat from an electrochemical cell directly to both heat transfer fluids and thermal energy storage materials.

SUMMARY OF THE INVENTION

One aspect of the invention is a device including an inlet for receiving a heat transfer fluid; one or more electrochemical cell compartments for receiving one or more electrochemical cells; one or more thermal energy storage material compartments containing one or more thermal energy storage materials; and one or more heat transfer fluid compartments for flowing the heat transfer fluid through the device; wherein the space between the one or more heat transfer fluid compartments and the one or more electrochemical cell compartments preferably includes one or more first regions (i.e. one or more first portions) that are substantially free of the thermal energy storage material; and the space between the one or more heat transfer fluid compartments and the one or more thermal energy storage material compartments preferably includes one or more second regions (i.e. one or more second portions) that are substantially free of an electrochemical cell; so that the heat transfer fluid compartment is in direct thermal communication with both the thermal energy storage material compartment and the electrochemical cell compartment.

Another aspect of the invention is a system including a temperature regulating device as described herein, and a heat storage device, wherein the heat storage device includes an insulated container having an outlet, one or more thermal energy storage material compartments inside the insulated container and including a thermal energy storage material, and one or more heat transfer fluid compartments for flowing a heat transfer fluid through the heat storage device, wherein the heat transfer fluid compartment is in thermal communication with the thermal energy storage material compartment; a means for flowing a heat transfer fluid from the outlet of the heat storage device to the inlet to the temperature regulating device; wherein the system is a temperature regulating system for regulating the temperature of the one or more electrochemical cells.

A process related aspect of the invention is a method for regulating the temperature of an electrochemical cell including a step of transferring heat into the battery temperature regulating device described herein using a heat transfer fluid.

Another process related aspect of the invention is a method for regulating the temperature of an electrochemical cell using the battery temperature regulating system as described herein, including a step of transferring heat from the heat storage device to the battery temperature regulating device.

The devices, systems and processes of the present invention advantageously are capable of transferring heat from an electrochemical cell directly to both a heat transfer fluid and a thermal energy storage material. The devices, systems and processes of the present invention surprisingly are able to rapidly remove heat from an electrochemical cell, rapidly provide heat to an electrochemical cell, efficiently maintain an electrochemical cell between a minimum target temperature and a maximum target temperature, efficiently store heat, or any combination thereof.

BRIEF DESCRIPTION OF THE FIGURES

The present invention is further described in the detailed description which follows, in reference to the noted plurality of drawings by way of non-limiting examples of embodiments of the present invention, in which like reference numerals represent similar parts throughout the several views of the drawings, and wherein:

As illustrated in FIG. 2A, a heat transfer fluid compartment may have surfaces that are generally planar.

As illustrated in FIG. 2B, the battery temperature regulating device may including a first heat transfer fluid compartment for a first heat transfer fluid and a second heat transfer fluid compartment for a second heat transfer fluid.

FIG. 3 is a portion of a cross-section of another illustrative battery temperature regulating device.

As illustrated in FIG. 4, the device may include an electrochemical cell compartment having a generally planar surface.

As illustrated in FIG. 6, the heat storage device may include a capillary structure.

As illustrated in FIG. 8A, the system may include a heat storage device having an electric heater.

As illustrated in FIG. 8B, the system may include a heat storage device having an electric heater, the heat storage device may be integrated inside the battery temperature regulating device, or both.

As illustrated in FIG. 9, the system may include a first heat transfer fluid for removing heat from the battery temperature regulating device and a second heat transfer fluid for providing heat to the battery temperature regulating device.

DETAILED DESCRIPTION OF THE PRESENT INVENTION

Figure 1:
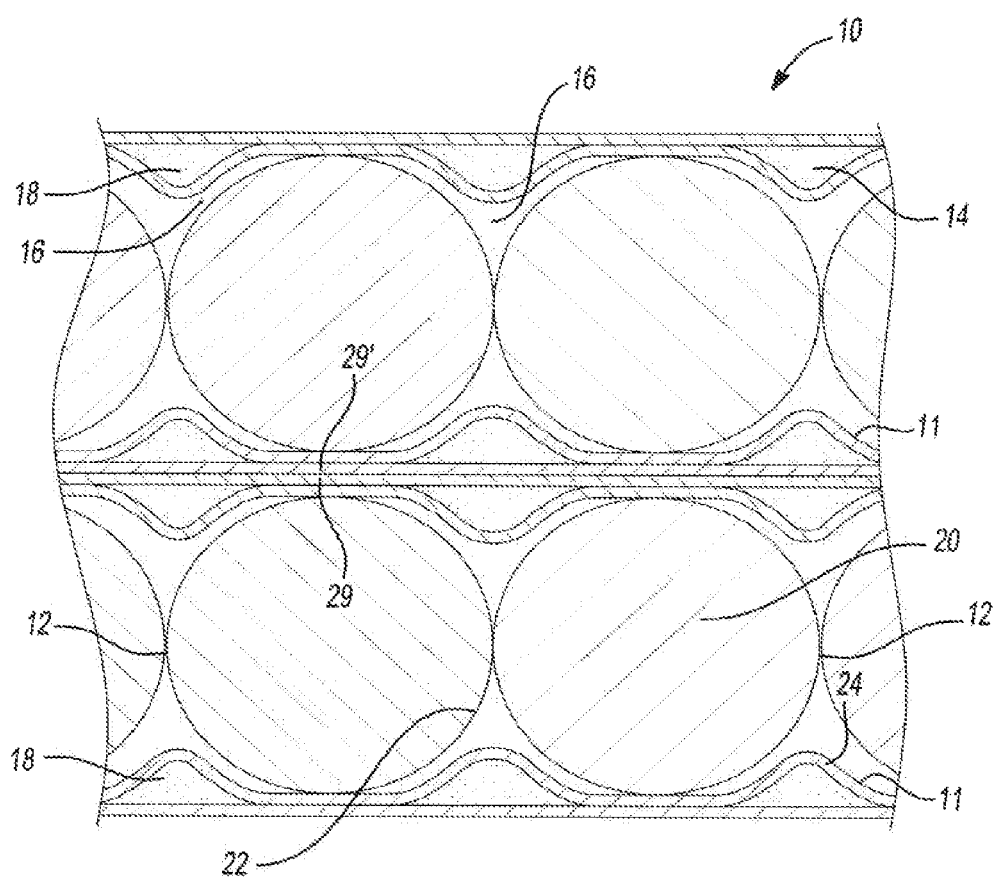
FIG. 1 is a portion of a cross-section of an illustrative battery temperature regulating device.

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the invention is not limited to the specific embodiments described below, but rather, the invention includes all alternatives, modifications, and equivalents falling within the true scope of the appended claims.

As will be seen from the teachings herein, the present invention provides unique devices, systems and process for regulating the temperature of an electrochemical cell that have benefits of being more efficient, more reliable or both.

The battery temperature regulating systems of the present invention include one or more thermal energy storage materials and one or more heat transfer fluids. For example, the battery temperature regulating system may include a novel battery temperature regulating device that contains one or more electrochemical cells, a thermal energy storage material, and one or more heat transfer fluid compartments. The one or more heat transfer fluid compartments may be employed for flowing a heat transfer fluid through the device for removing heat from a thermal energy storage material in the device for removing heat from an electrochemical cell, for providing heat to a thermal energy storage material in the device, for providing heat to an electrochemical cell, or any combination thereof. Preferably the one or more heat transfer fluid compartments includes one or more portions in thermal communication with the thermal energy storage material and one or more portions in thermal communication with the electrochemical cells.

Battery Temperature Regulating Device

The battery temperature regulating device may include one or more heat transfer fluid compartments, one or more electrochemical cell compartments, and one or more thermal energy storage materials compartments. The space between the one or more heat transfer fluid compartments and the one or more electrochemical cell compartments preferably includes one or more regions that are substantially or entirely free of the thermal energy storage material (i.e., one or more regions that are free of thermal energy storage material interposed between the electrochemical cell compartment and the heat transfer fluid compartment). The space between the one or more heat transfer fluid compartments and the one or more thermal energy storage material compartments preferably includes one or more regions that are substantially or entirely free of the electrochemical cell (i.e., one or more regions that are free of an electrochemical cell or a portion of an electrochemical cell interposed between the thermal energy storage material compartment and the heat transfer fluid compartment). As such the heat transfer fluid compartment preferably is in thermal communication (e.g., direct thermal communication) with both an electrochemical cell compartment and a thermal energy storage material compartment.

In its various aspects, the invention is predicated on improving or maintaining the performance of one or more electrochemical cells in a battery temperature regulating device by controlling the temperature of an electrochemical cell, such as by removing heat from an electrochemical cell, providing heat to an electrochemical cell, maintaining a temperature of an electrochemical cell, or any combination thereof.

The battery temperature regulating device advantageously may be employed so that a temperature of an electrochemical cell in the battery is cooled to a temperature below a maximum operating temperature of the electrochemical cell, is heated to a temperature above a minimum operating temperature of the electrochemical cell, maintained within a target temperature range, or any combination thereof. As such, the battery temperature regulating device may include one or more means for transferring thermal energy into the device, one or means for removing thermal energy from the device, one or more means for maintaining the temperature in the device below a high temperature limit, one or more means for maintaining a temperature in the device above a low temperature limit, or any combination thereof. Preferably the battery temperature regulating device includes at least a means for heating the electrochemical cells, a means for cooling the electrochemical cells, and a means for maintaining a temperature in the electrochemical cells.

The battery temperature regulating device includes one or more electrochemical cell compartments for receiving or otherwise containing one or more electrochemical cells, and one or more heat transfer fluid compartments. The one or more heat transfer fluid compartments preferably are isolated from the one or more electrochemical cell compartments so that the heat transfer fluid does not enter the electrochemical cell. The battery temperature regulating device may contain one or more heat transfer fluid inlets for flowing a heat transfer fluid into the heat transfer fluid compartment. The battery regulating device preferably has one or more heat transfer fluid outlets for removing the heat transfer fluid from the device.

Preferably the battery temperature regulating device includes a means of transferring heat into the device and a means of transferring heat out of the device. For example, the battery temperature device may be in thermal communication with a component outside of the device. Such a thermal communication may include a fluid, such as a heat transfer fluid, or a solid having a thermal conductivity and contact area sufficiently high so that heat can be rapidly provided to or removed from the device. The means of transferring heat into the battery temperature regulating device preferably includes circulating a heat transfer fluid through the temperature regulating device. The means of transferring heat out of the battery temperature regulating device preferably includes circulating a heat transfer fluid through the device. The heat transfer fluid for heating and the heat transfer fluid for cooling the battery temperature regulating device may be the same or different. The heat transfer fluid for heating and the heat transfer fluid for cooling the battery temperature regulating device may both circulate through the same heat transfer fluid compartment. Alternately, the battery temperature regulating device may include a first heat transfer fluid for cooling the device and a second heat transfer fluid for heating the device. Optionally, any of the heat transfer fluids employed in the battery temperature regulating device may include or consist essentially of a working fluid. For example, the device may include a working fluid for transferring heat into the device, a working fluid for transferring heat out of the device, or both.

Thermal Energy Storage Material Compartment

As described above, the thermal energy storage material preferably is isolated in one or more compartments. Typically the thermal energy storage material has a relatively low thermal conductivity, in units of W/m·K, a relatively low thermal diffusivity, in units of m$^2$/s, or both. For example, the thermal energy storage material may have a thermal conductivity, a thermal diffusivity or both that is less than the material of the compartment in which it is provided. Thermal energy storage materials having a relatively high thermal conductivity, a relatively high thermal diffusivity, or both may also be employed. Preferably the shape and/or size of the one or more compartments is selected so that thermal energy can rapidly transferred into and out of the thermal energy storage material. As such, the thermal energy storage material compartments may employ one or means for increasing the rate of heat transfer into and out of the thermal energy storage material. The rate of heat transfer may be measured as the power per volume of thermal energy storage material (i.e., watts/m$^3$). For example, the one or more thermal energy storage materials may have at least one dimension that is relatively small (e.g., compared with one or more other dimensions), the thermal energy storage material may be stored in a plurality of compartments, the interior of the one or more compartments may have thermally conductive objects (e.g., fins, wire, mesh, and the like), or any combination thereof.

The thermal energy storage material preferably is divided between a sufficient number of cells or capsules so that if one or two cells or capsules fail, the amount of thermal energy storage material that will possibly escape is small, the device will continue to function, or both. For example the amount of thermal energy storage material in a single cell preferably is less than 35 percent, more preferably less than 10 percent, and even more preferably less than about 5 percent, and most preferably less than about 2 percent based on the total amount of thermal energy storage material in the device. Preferably some or all of the cells that contain at least 0.01 percent of the thermal energy storage material.

The area of contact between the thermal energy storage material compartment and the heat transfer fluid compartment may be sufficiently high so that heat can be efficiently removed from the thermal energy storage material by a heat transfer fluid. $A_{TESM}$ is the area of contact between the one or more heat transfer fluid compartments and the one or more thermal energy storage material compartments, and $A_{EC}$ is the area of contact between the one or more heat transfer fluid compartments and the one or more electrochemical cell compartments. The ratio of $A_{TESM}/(A_{TESM}+A_{EC})$ may be greater than 0.01, preferably greater than 0.05, more preferably greater than 0.10, even more preferably greater than about 0.2, and most preferably greater than about 0.25. The ratio of $A_{TESM}/V_{TESM}$, where $V_{TESM}$ is the volume of the thermal energy storage material (measured at a temperature of 25° C.) in the one or more thermal energy storage material compartments may be sufficiently high so that thermal lags due to thermal diffusion from the center a thermal energy storage compartment are reduced. For example, the ratio of $A_{TESM}/V_{TESM}$, is preferably greater than about 0.05 mm$^{-1}$, more preferably greater than about 0.2 mm$^{-1}$, even more preferably greater than about 0.5 mm$^{-1}$, and most preferably greater than about 1 mm$^{-1}$.

The thermal energy storage material preferably is in a plurality of individually isolated cells (such as capsules), having a total surface area of the plurality of cells that is relatively high, a distance from a surface of a cell to the center of the cell that is relatively low, or both. The plurality of cells (e.g., capsules) may be arranged in one or more layers of cells. For example, the heat storage device may include a plurality of layers of cells (e.g., capsules). Each layer of cells may contain a single cell or a plurality of cells. In general, a layer of cells refers to one or more cells that are structural interconnected. For example a layer of cells may be formed by sealingly attaching at least the periphery of two sheets (e.g., two foils) having thermal energy storage material between them, so that one or more spaces containing the thermal energy storage material is formed. It will be appreciated that a layer of cells (e.g., a layer of capsules) may have a relatively low thickness, a relatively high surface area to volume ratio, or both, so that heat can be rapidly removed from the interior of the cells. The cells may be in any arrangement in a layer. For example, the cells may be of the same size and shape, the cells may have varying sizes and shapes, the cells may be arranged in a repeating pattern (e.g., a pattern that contains 1, 2, or more cells) or may be arranged in a pattern that generally does not repeat. In a preferred aspect of the invention, the cells are arranged as an array of capsules (e.g., a 1-dimensional array, a 2-dimensional array, or a radial array) in each layer of capsules.

The heat storage device may include a plurality of layers of capsules with spacing between one or more pairs of adjacent layers of capsules. The spacing may be used as a portion of the heat transfer fluid compartment. Layers of capsules may have the spacing on one side, have spacings on two opposing sides, have no spacing, or any combination thereof. For example, there may be a spacing between every pair of adjacent layers of capsules.

A layer of capsules may have a surface that is arcuate and an opposing surface that is generally flat. A generally arcuate surface may be particularly attractive for a heat transfer fluid, where the arcuate path may increase the heat flow between the heat transfer fluid and the capsules, for contacting the capsules with a generally arcuate electrochemical cell compartment, or both. A generally flat surface may be particularly attractive for reducing the pressure drop of the heat transfer fluid as it flows through the heat transfer fluid compartment, for contacting the capsules with a generally flat electrochemical cell compartment, or both. A general flat surface may also be particularly attractive for placement of an optional capillary structure (and the thickness of the capillary structure may determine the separation between two layers of capsules on either side of a portion of the working fluid compartment) so that the heat transfer fluid compartment can be used as a condenser of a capillary pumped loop. Layers having opposing surfaces that are both generally flat or both arcuate may also be employed. Two adjacent layers of capsules that partially or substantially entirely nest together may also be employed. For example, two adjacent layers of capsules may nest together and be separated by a gap that allows the heat transfer fluid to flow between the two layers.

The size and shape of the capsules may be chosen to maximize the transfer of heat to and from the phase change material contained in the capsules. The average thickness of the capsules (e.g., the layer of capsules) may be chosen such that the heat can quickly escape from the center of the capsule. The average thickness of the capsules preferably is less than about 100 mm, more preferably less than about 30 mm, even more preferably less than about 10 mm, even more preferably less than about 5 mm, and most preferably less than about 3 mm. The capsules must be thick enough to effectively store thermal energy. The average thickness of the capsules preferably is greater than about 0.1 mm, more preferably greater than about 0.5 mm, even more preferably greater than about 0.8 mm, and most preferably greater than 1.0 mm.

The capsules preferably have a relatively high surface area to volume ratio so that the area of contact with the working fluid, the area of contact with the heat transfer fluid, or both is relatively high, so that heat can be quickly provided to and/or removed from the capsules. For example, the capsules may have a surface that maximizes the contact with a working fluid compartment, the capsules may have a geometry that maximizes the transfer of heat between the capsule and the working fluid compartment, or both. The ratio of the total surface area of the interface between the working fluid compartment and the phase change material compartment to the total volume of the thermal energy storage material in the heat storage device may be chosen to be greater than about $0.02$ $mm^{-1}$ and is preferably greater than about $0.05$ $mm^{-1}$, more preferably greater than about $0.1$ $mm^{-1}$, even more preferably greater than about $0.2$ $mm^{-1}$, and most preferably greater than about $0.3$ $mm^{-1}$. The ratio of the total surface area of the interface between the working fluid compartment and the phase change material compartment to the total volume of the thermal energy storage material in the heat storage device must be sufficiently low so that the device contains enough thermal energy storage material to store the heat. The ratio of the total surface area of the interface between the working fluid compartment and the phase change material compartment to the total volume of the thermal energy storage material in the heat storage device preferably is chosen to be less than about 30 $mm^{-1}$.

The thermal energy storage material compartment may be in the form of a blister pack or a stack of blister packs. For example, the thermal energy storage material may be encapsulated between an embossed metal layer and a flat metal layer which are sealed together to form a plurality of isolated capsules. Without limitation, the heat storage device may employ a capsule or an arrangement of capsules (e.g., a blister pack or stack of blister packs) described in U.S. patent application Ser. No. 12/389,598 entitled "Heat Storage Devices" and filed on Feb. 20, 2009.

Forming Capsules

The capsules of the thermal energy storage material may be formed using any method that provides for the encapsulation of the thermal energy storage material. Without limitation, the process may employ one or any combination of the following: embossing or otherwise deforming a thin material sheet (e.g., a foil) to define a pattern in the sheet, filling depressions in the embossed sheet with the thermal energy storage material, covering an embossed sheet with a second sheet (e.g., a generally flat sheet), or attaching the two sheets. The process of forming the capsules may employ the processes described in U.S. patent application Ser. No. 12/389,598 entitled "Heat Storage Devices" and filed on Feb. 20, 2009.

Suitable sheets for encapsulating the thermal energy storage material include thin metal sheets (e.g., metal foil) that are durable, corrosion resistant, or both, so that the sheet is capable of containing the thermal energy storage material, preferably without leakage. The metal sheets may be capable of functioning in a vehicle environment with repeated thermal cycling for more than 1 year and preferably more than 5 years. The metal sheet may otherwise have a substantially inert outer surface that contacts the thermal energy storage material in operation. Without limitation, exemplary metal sheets that may be employed include metal sheets having at least one layer of brass, copper, aluminum, nickel-iron alloy, bronze, titanium, stainless steel or the like. The sheet may be a generally noble metal or it may be one that includes a metal which has an oxide layer (e.g. a native oxide layer or an oxide layer which may be formed on a surface). One exemplary metal sheet is an aluminum foil which comprises a layer of aluminum or an aluminum containing alloy (e.g. an aluminum alloy containing greater than 50 weight percent aluminum, preferably greater than 90 wt percent aluminum). Another exemplary metal sheet is stainless steel. Suitable stainless steels include austenitic stainless steel, ferritic stainless steel or martensitic stainless steel. Without limitation, the stainless steel may include chromium at a concentration greater than about 10 weight percent, preferably greater than about 13 weight percent, more preferably greater than about 15 weight percent, and most preferably greater than about 17 weight percent. The stainless steel may include carbon at a concentration less than about 0.30 weight percent, preferably less than about 0.15 weight percent, more preferably less than about 0.12 weight percent, and most preferably less than about 0.10 weight percent. For example, stainless steel 304 (SAE designation) containing 19 weight percent chromium and about 0.08 weight percent carbon. Suitable stainless steels also include molybdenum containing stainless steels such as 316 (SAE designation).

The metal sheet has a thickness sufficiently high so that holes or cracks are not formed when forming the sheet, when filling the capsules with thermal energy storage material, during use of the capsules, or any combination thereof. For applications such as transportation, the metal sheet preferably is relatively thin so that the weight of the heat storage device is not greatly increased by the metal sheet. Suitable thicknesses of the metal sheet may be greater than about 10 μm, preferably greater than about 20 μm, and more preferably greater than about 50 μm. The metal foil may have a thickness less than about 3 mm, preferably less than 1 mm, and more preferably less than 0.5 mm (e.g., less than about 0.25 mm).

Thermal Energy Storage Material

Without limitation, suitable thermal energy storage materials for the heat storage device include materials that are capable of exhibiting a relatively high density of thermal energy as sensible heat, latent heat, or preferably both. The thermal energy storage material is preferably compatible with the operating temperature range of the heat storage device. For example the thermal energy storage material is preferably a solid at the lower operating temperature of the heat storage device, is at least partially a liquid (e.g., entirely a liquid) at the maximum operating temperature of the heat storage device, does not significantly degrade or decompose (e.g., during a time of at least about 1,000 hours, preferably at least about 10,000 hours) at the maximum operating temperature of the device, or any combination thereof. The thermal energy storage material may be a phase change material having a solid to liquid transition temperature (e.g., a liquidus temperature, a melting temperature, or a eutectic temperature). The solid to liquid transition temperature may be greater than about 30° C., preferably greater than about 35° C., more preferably greater than about 40° C., even more preferably greater than about 45° C., and most preferably greater than about 50° C. The thermal energy storage material may have a solid to liquid transition temperature less than about 400° C., preferably less than about 350° C., more preferably less than about 290° C., even more preferably less than about 250° C., and most preferably less than about 200° C. The thermal energy storage material may have a heat of fusion density greater than about 0.1 MJ/liter, preferably greater than about 0.2 MJ/liter, more preferably greater than about 0.4 MJ/liter, and most preferably greater than about 0.6 MJ/liter. Typically, the thermal energy storage material has a heat of fusion density less than about 5 MJ/liter. However, thermal energy storage materials having a higher heat of fusion density may also be employed. The thermal energy storage material may have a density less than about 5 g/cm$^3$, preferably less than about 4 g/cm$^3$, more preferably less than about 3.5 g/cm$^3$, and most preferably less than about 3 g/cm$^3$.

The thermal energy storage material compartment may contain any art known thermal energy storage material. Examples of thermal energy storage materials that may be employed in the thermal energy storage material compartments include the materials described in Atul Sharma, V. V. Tyagi, C. R. Chen, D. Buddhi, "Review on thermal energy storage with phase change materials and applications", Renewable and Sustainable Energy Reviews 13 (2009) 318-345, and in Belen Zalba, Jose Ma Marin, Luisa F. Cabeza, Harald Mehling, "Review on thermal energy storage with phase change: materials, heat transfer analysis and applications", Applied Thermal Engineering 23 (2003) 251-283, both incorporated herein by reference in their entirety. Other examples of suitable thermal energy storage materials that may be employed in the heat transfer device include the thermal energy storage materials described in U.S. patent application Ser. No. 12/389,416 entitled "Thermal Energy Storage Materials" and filed on Feb. 20, 2009; and U.S. patent application Ser. No. 12/389,598 entitled "Heat Storage Devices" and filed on Feb. 20, 2009.

The thermal energy storage material may include an organic material, an inorganic material or a mixture of an organic and an inorganic material. Organic compounds that may be employed include paraffins and non-paraffinic organic materials, such as a fatty acid. Inorganic materials that may be employed include salt hydrates and metallics. The thermal energy storage material may be a compound or a mixture (e.g., a eutectic mixture) having a solid to liquid transition at generally a single temperature. The thermal energy storage material may be a compound or a mixture having a solid to liquid transition over a range of temperatures (e.g., a range of greater than about 3° C., or greater than about 5° C.).

Without limitation, suitable non-paraffinic organic materials that may be used alone or as a mixture include polyethylene glycol, capric acid, eladic acid, lauric acid, pentadecanoic acid, tristearin, myristic acid, palmatic acid, stearin acid, acetamide, methyl fumarate, formic acid, caprilic acid, glycerin, D-lactic acid, methyl palmitate, camphenilone, docasyl bromide, caprylone, phenol, heptadecanone, 1-cyclohexylooctadecane, 4-heptadacanone, p-joluidine, cyanamide, methyl eicosanate, 3-heptadecanone, 2-heptadecanone, hydrocinnamic, cetyl alcohol, nepthylamine, camphene, o-nitroaniline, 9-heptadecanone, thymol, methyl behenate, diphenyl amine, p-dichlorobenzene, oxalate, hypophosphoric, o-xylene dichloride, chloroacetic, nitro naphthalene, trimyristin, heptaudecanoic, bees wax, glyolic acid, glycolic acid, p-bromophenol, azobenzene, acrylic acid, dinto toluent, phenylacetic acid, thiosinamine, bromcamphor, durene, benzylamine, methyl brombrenzoate, alpha napthol, glautaric acid, p-xylene dichloride, catechol, quinone, acetanilide, succinic anhydride, benzoic acid, stibene, benzamide, or any combination thereof.

Without limitation, suitable inorganic salts that may be used alone or as a mixture include $K_2HPO_4.6H_2O$, $FeBr_3.6H_2O$, $Mn(NO_3)_2.6H_2O$, $FeBr_3.6H_2O$, $CaCl_2.12H_2O$, $LiNO_3.2H_2O$, $LiNO_3.3H_2O$, $Na_2CO_3.10H_2O$, $Na_2SO_4.10H_2O$, $KFe(SO_3)_2.12H_2O$, $CaBr_2.6H_2O$, $LiBr_2.2H_2O$, $Zn(NO_3)_2.6H_2O$, $FeCl_3.6H_2O$, $Mn(NO_3)_2.4H_2O$, $Na_2HPO_4.12H_2O$, $CoSO_4.7H_2O$, $KF.2H_2O$, $MgI_2.8H_2O$, $CaI_2.6H_2O$, $K_2HPO_4.7H_2O$, $Zn(NO_3)_2.4H_2O$, $Mg(NO_3).4H_2O$, $Ca(NO_3).4H_2O$, $Fe(NO_3)_2.9H_2O$, $Na_2SiO_3.4H_2O$, $K_2HPO_4.3H_2O$, $Na_2S_2O_3.5H_2O$, $MgSO_4.7H_2O$, $Ca(NO_3)_2.3H_2O$, $Zn(NO_3)_2.2H_2O$, $FeCl_3.2H_2O$, $Ni(NO_3)_2.6$; $H_2O$, $MnCl_2.4H_2O$, $MgCl_2.4H_2O$, $CH_3COONa.3H_2O$, $Fe(NO_3)_2.6H_2O$, $NaAl(SO_4)_2.10H_2O$, $NaOH.H_2O$, $Na_3PO_4.12H_2O$, $LiCH_3COO.2H_2O$, $Al(NO_3)_2.9H_2O$, $Ba(OH)_2.8H_2O$, $Mg(NO_3)_2.6H_2O$, $KAl(SO_4)_2.12H_2O$, $MgCl_2.6H_2O$, or any combination thereof. It will be appreciated that inorganic salts having higher or lower concentrations of water may be used.

The thermal energy storage material may include (or may even consist essentially of or consist of) at least one first metal containing material, and more preferably a combination of the at least one first metal containing material and at least one second metal containing material. The first metal containing material, the second metal containing material, or both, may be a substantially pure metal, an alloy such as one including a substantially pure metal and one or more additional alloying ingredients (e.g., one or more other metals), an intermetallic, a metal compound (e.g., a salt, an oxide or otherwise), or any combination thereof. One preferred approach is to employ one or more metal containing materials as part of a metal compound; a more preferred approach is to employ a mixture of at least two metal compounds. By way of example, a suitable metal compound may be selected from oxides, hydroxides, compounds including nitrogen and oxygen (e.g., nitrates, nitrites or both), halides, or any combination thereof. It is possible that ternary, quaternary or other multiple component material systems may be employed also. The thermal energy storage materials herein may be mixtures of two or more materials that exhibit a eutectic.

Insulation

The battery temperature regulating device preferably is at least partially insulated so that heat loss from the device is reduced or minimized when the electrochemical cells are not generating heat. The insulation may allow the device to maintain a temperature above a minimum target temperature when the electrochemical cells are not generating heat for a relatively long time. The insulation may allow the device to maintain a temperature above a minimum target temperature for a time greater than, preferably at least 50 percent greater than, and most preferably 100 percent greater than a device that does not contain insulation and is otherwise identical. The time the device remains above the minimum target temperature may be measured by heating the device to the maximum target temperature and then exposing the device to an ambient temperature of −30° C. without providing further heat to the device (i.e., the heat transfer fluid is not circulated and the electrochemical cells are not charged or discharged). Thus measure, the battery temperature regulating device maintains a temperature above the minimum target temperature for preferably at least about 5 minutes, more preferably at least 20 minutes, and most preferably at least about 60 minutes.

Any known form of insulation which prevents loss of heat by the heat storage device may be utilized. For example, any insulation as disclosed in U.S. Pat. No. 6,889,751, incorporated herein of its entirety by reference, may be employed. The heat storage device preferably is an (thermally) insulated container, such that it is insulated on one or more surfaces. Preferably, some or all surfaces that are exposed to ambient or exterior will have an adjoining insulator. The insulating material may function by reducing the convection heat loss, reducing the radiant heat loss, reducing the conductive heat loss, or any combination. Preferably, the insulation may be through the use of an insulator material or structure that preferably has relatively low thermal conduction. The insulation may be obtained through the use of a gap between opposing spaced walls. The gap may be occupied by a gaseous medium, such as an air space, or possibly may even be an evacuated space (e.g., by use of a Dewar vessel), a material or structure having low thermal conductivity, a material or structure having low heat emissivity, a material or structure having low convection, or any combination thereof. Without limitation, the insulation may contain ceramic insulation (such as quartz or glass insulation), polymeric insulation, or any combination thereof. The insulation may be in a fibrous form, a foam form, a densified layer, a coating or any combination thereof. The insulation may be in the form of, a woven material, an unwoven material, or a combination thereof. The heat transfer device may be insulated using a Dewar vessel, and more specifically a vessel that includes generally opposing walls configured for defining an internal storage cavity, and a wall cavity between the opposing walls, which wall cavity is evacuated below atmospheric pressure. The walls may further utilize a reflective surface coating (e.g., a mirror surface) to minimize radiant heat losses.

Preferably, a vacuum insulation around the system is provided. More preferably, a vacuum insulation as disclosed in U.S. Pat. No. 6,889,751, incorporated herein of its entirety by reference, is provided.

FIG. 1 is an illustrative portion of a cross-section of an exemplary battery temperature regulating device 10. With reference to FIG. 1, the battery temperature regulating device 10 may include one or more electrochemical cell compartments 12, one or more thermal energy storage material compartments 14, and one or more heat transfer fluid compartments 16. The thermal energy storage material compartment may contain one or more thermal energy storage materials 18. The electrochemical cell compartment may contain one or more electrochemical cells 20. A portion of the space between the heat transfer fluid compartment and the electrochemical cell compartment 22 is substantially or entirely free of thermal energy storage material. A portion of the space between the heat transfer fluid compartment and the thermal energy storage material compartment 24 is substantially or entirely free of an electrochemical cell. As illustrated in FIG. 1, the area of contact between the thermal energy storage material compartment 14 and the electrochemical cell compartment 12 may be relatively small or even zero. For example, less than about 5 percent, less than about 3 percent, less than about 2 percent, or less than about 1 percent of the surface area of the thermal energy storage material compartment may contact the electrochemical cell compartment, based on the total surface area of the thermal energy storage material that is in contact with either the electrochemical cell compartment or the heat transfer fluid compartment.

Figure 2A:
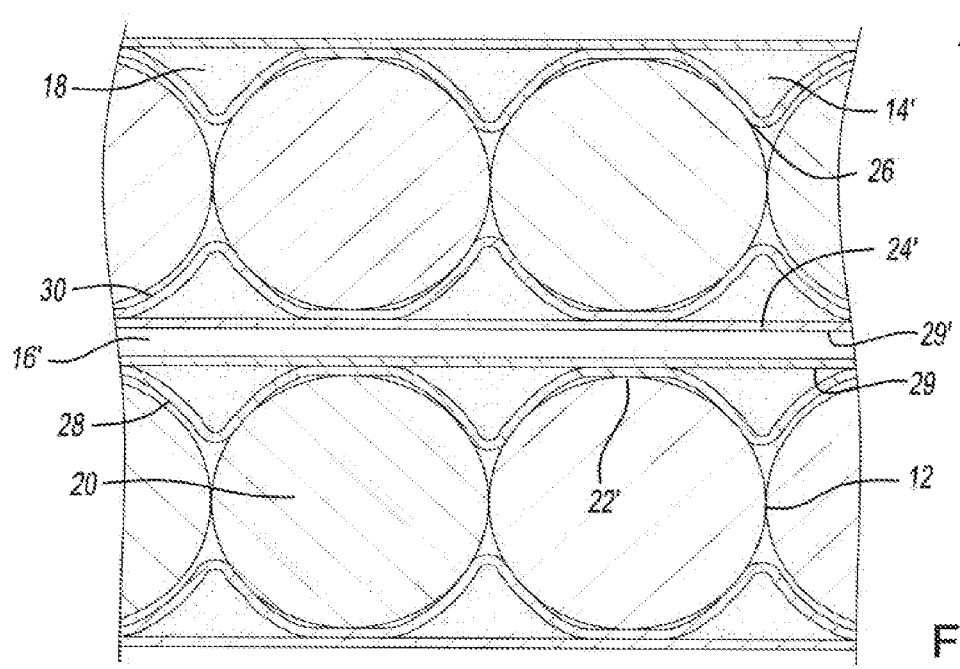
FIG. 2A is a portion of a cross-section of an illustrative battery temperature regulating device.
Figure 2B:
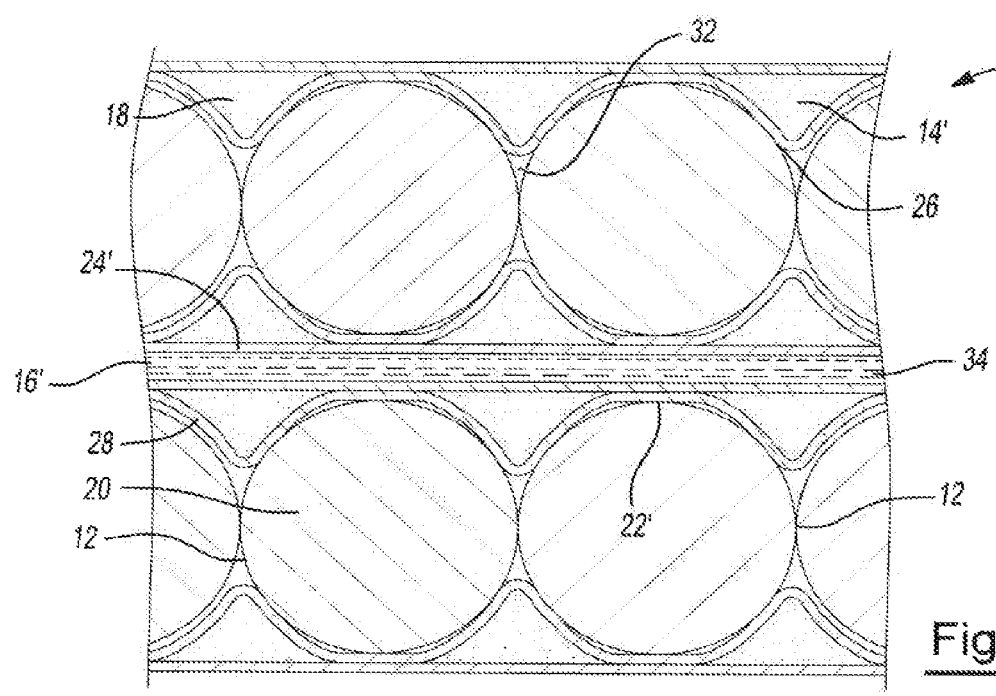
FIG. 2B is a portion of a cross-section of an illustrative battery temperature regulating device.

FIG. 2A is another illustrative portion of a cross-section of an exemplary battery temperature regulating device 10'. As illustrated in FIG. 2A, the shape of the thermal energy storage material compartment 14' may be selected so that the electrochemical cell compartment 12 at least partially nests in the thermal energy storage material compartment. The area of contact 26 between the thermal energy storage material compartment and the electrochemical cell compartment may be relatively high so that the thermal energy storage material is in direct thermal communication with the electrochemical cell. For example, at least about 5 percent, at least about 10 percent, at least about 20 percent, or at least about 30 percent of the surface area of the thermal energy storage material compartment may contact the electrochemical cell compartment, based on the total surface area of the thermal energy storage material that is in contact with either the electrochemical cell compartment or the heat transfer fluid compartment. The thermal energy storage compartments may consist of a plurality of capsules, such a plurality of blister packs. As illustrated in FIG. 2A, the thermal energy storage compartment may include at least a first blister pack 28 and a second blister pack 30. The first blister pack 28 and the second blister pack 30 may be separated and the space between the first blister pack and the second blister pack may define at least a portion of the heat transfer fluid compartment 16'. For example, a generally flat first surface 29 of the first blister pack and a generally flat surface 29' of a second blister pack facing the first surface may be separated to allow a space for flowing a heat transfer fluid. As illustrated in FIG. 2B, the battery temperature regulating device may include separate heat transfer fluid compartments for removing heat and for providing heat. For example, the battery temperature regulating device 10" may have a first heat transfer fluid compartment 16' and a second heat transfer fluid compartment 32. As illustrated in FIG. 2B, one (or both) of the heat transfer fluid compartments may contain a working fluid 34 when in use.

The first blister pack and the second blister pack may be aligned with capsules of thermal energy storage material generally symmetrically positioned. Such an arrangement is illustrated in FIGS. 1, 2A and 2B. The first and second blister packs may be aligned in an asymmetric arrangement. For example, the first blister pack 28' may be transposed relative to the second blister packs 30', such as illustrated in FIG. 3. As such, at least a portion of the space between the heat transfer fluid compartment and the electrochemical cell compartment may contain thermal energy storage material (i.e., thermal energy storage material may be partially interposed between the heat transfer fluid compartment and the electrochemical cell compartment).

Figure 4:
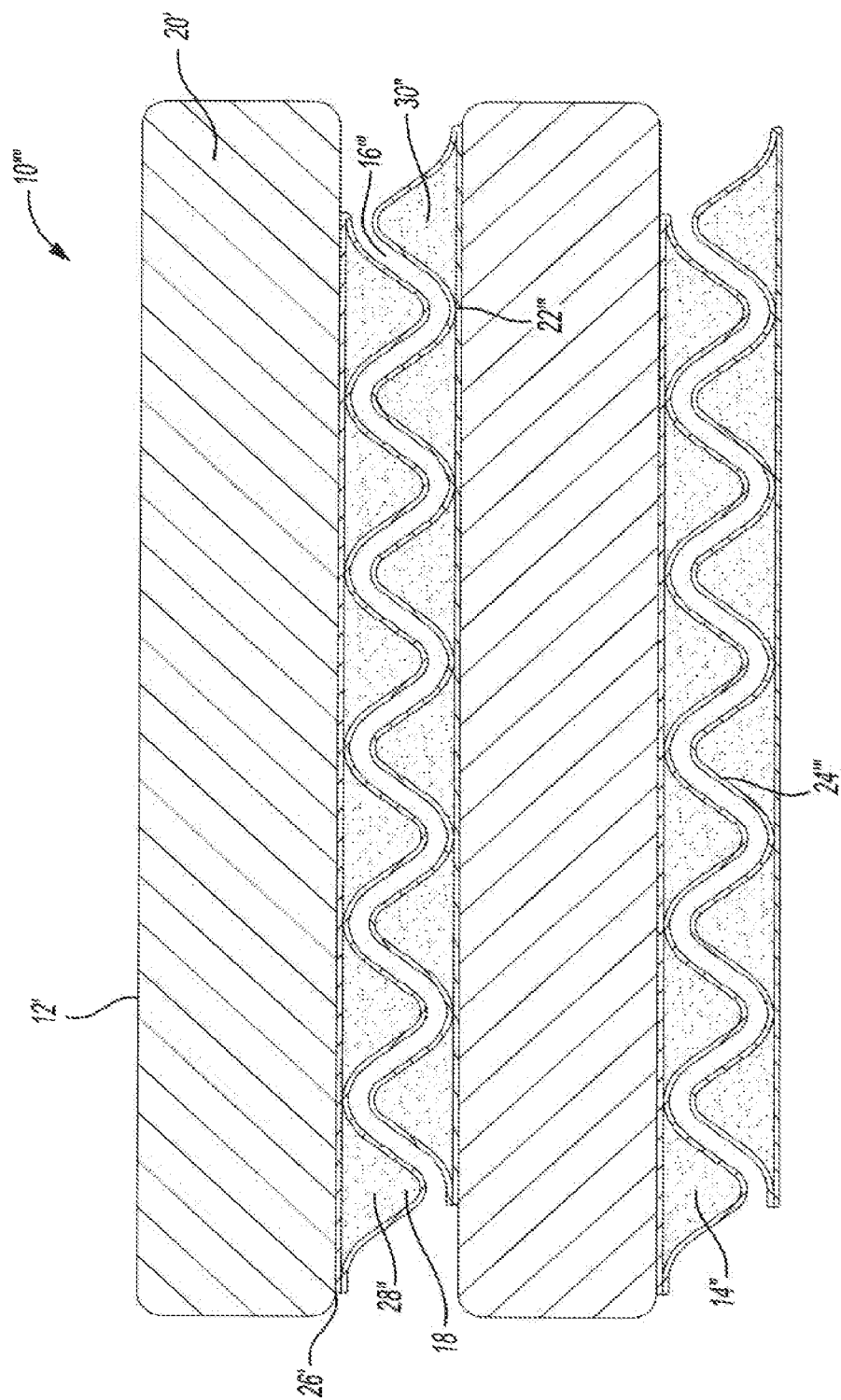
FIG. 4 is a portion of a cross-section of an illustrative temperature regulating device.

As illustrated in FIG. 4, an electrochemical cell compartment 12' may have a generally flat surface. A first blister pack 28" including one or more thermal energy storage material compartments 14" may be arranged so that the generally flat surface of the blister pack is in contact with the generally flat surface of the electrochemical cell compartment. An adjacent second blister pack 30" may partially nest with the first blister pack 28". The space between the two blister packs may be employed as part of the heat transfer fluid compartment 16".

Electrochemical Cell Compartment/Electrochemical Cell

The electrochemical cell compartment preferably is capable of receiving or otherwise containing one or more electrochemical cells. The electrochemical cell compartment preferably is in thermal communication with both the thermal energy storage material compartment and the heat transfer fluid compartment.

The electrochemical cell may be any art known electrochemical cell that produces electricity. For example, the electrochemical cell may be capable of deriving electrical energy from one or more chemical reactions. The electrochemical cell may be a primary electrochemical cell or a secondary electrochemical cell. Preferably the electrochemical cell is a secondary electrochemical cell that can be recharged. Without limitation, suitable secondary electrochemical cells include lead acid cells, nickel cadmium cells, nickel metal hydride cells, lithium ion cells, lithium ion polymer cells, or any combination thereof. Preferred electrochemical cells include one or more anodes and one or more cathodes. A separator, such as a semi-permeable membrane is preferably employed between the anode and the cathode. The electrochemical cell preferably includes an electrolyte. An example of a primary electrochemical cell that may be employed is a fuel cell that produces electricity from a fuel.

Heat Transfer Fluid Compartment

The battery temperature regulating device has a heat transfer fluid compartment capable of containing a heat transfer fluid as it circulates through the device. The heat transfer fluid compartment preferably is connected to one or more inlets for flowing a heat transfer into the heat transfer fluid compartment. The heat transfer fluid compartment preferably is connected to one or more outlets for flowing a heat transfer out of the heat transfer fluid compartment. The heat transfer fluid compartment may be a space at least partially defined by one or more heat transfer fluid compartment walls, a space at least partially defined by one or more thermal energy storage compartments, a space at least partially defined by one or more electrochemical cell compartments, a space at least partially defined by a housing or container of the battery temperature regulating device, or any combination thereof.

The heat transfer fluid compartment preferably has sufficient thermal communication with both the one or more electrochemical cell compartments and the one or more thermal energy storage material compartments so that it can remove heat or provide heat to both the electrochemical cells and the thermal energy storage material. The heat transfer fluid compartment preferably is in direct thermal communication with one or more (or more preferably all) of the electrochemical cell compartments. A direct thermal communication can be any path of shortest distance between an electrochemical cell and a portion of the heat transfer fluid compartment that is free of thermal energy storage material, free of a material having low thermal conductivity. Low thermal conductivity materials include materials having a thermal conductivity less than about 100 W/(m·K), preferably less than about 10 W/(m·K), and more preferably less than about 3 W/(m·K). For example, the heat transfer fluid or the heat transfer fluid compartment may contact a wall of one or more (or preferably all) of the electrochemical cell compartments, or be separated from the electrochemical cell compartment substantially or entirely by materials having high thermal conductivity (e.g., greater than about 5 W/(m·K), greater than about 12 W/(m·K), or greater than about 110 W/(m·K). It will be appreciated that a very thin layer (e.g., less than about 0.1 mm, preferably less than about 0.01 mm, and more preferably less than about 0.001 mm) of a thermal energy storage material or a material having a low thermal conductivity may be between the heat transfer fluid compartment and an electrochemical cell without appreciably affecting the heat transfer. As such, the space between the one or more electrochemical cell compartments and one or more heat transfer fluid compartments preferably includes one or more regions that are substantially free of the thermal energy storage material. The heat transfer fluid compartment preferably is in direct thermal communication with one or more (or more preferably all) of the thermal energy storage compartments. A direct thermal communication can be any path of shortest distance between a thermal energy storage compartment and a portion of the heat transfer fluid compartment that is free of an electrochemical cell, free of a material having low thermal conductivity, or both. For example, the heat transfer fluid or the heat transfer fluid compartment may contact a wall of one or more (or preferably all) of the thermal energy storage material compartments, or be separated from the thermal energy storage material compartment substantially or entirely by materials having high thermal conductivity (e.g., greater than about 5 W/(M·K), greater than about 12 W/(m·K), or greater than about 110 W/(m·K). It will be appreciated that a very thin layer (e.g., less than about 0.1 mm, preferably less than about 0.01 mm, and more preferably less than about 0.001 mm) of a material having a low thermal conductivity may be between the heat transfer fluid compartment and a thermal energy storage material compartment without appreciably affecting the heat transfer. As such, the space between the one or more thermal energy storage material compartments and the one or more heat transfer fluid compartments preferably includes one or more regions that are substantially free of an electrochemical cell.

Battery Temperature Regulation System

The battery temperature regulating device may be employed in a system that includes one or more heat transfer fluids that flows through the battery temperature regulating device for removing heat from the device, for transferring heat into the device, or both. The battery temperature regulating system preferably includes one or more components for receiving heat (i.e., heat removing component) from the battery temperature regulating device, one or more components for providing heat (i.e., heat providing component) to the battery temperature regulating device, or both. The heat removing component preferably has a fluid connection with the battery temperature regulating device so that a heat transfer fluid can circulate through both. The heat removing component is preferably connected to the battery temperature regulating device with two or more lines (e.g., tubes) including a first line for transferring the heat transfer fluid into the heat removing component and a second line for transferring the heat transfer fluid out of the heat removing component. The heat providing component is preferably connected to the battery temperature regulating device with two or more lines (e.g., tubes) including a first line for transferring the heat transfer fluid into the heat providing component and a second line for transferring the heat transfer fluid out of the heat providing component. The heat providing component preferably has a fluid connection with the battery temperature regulating device so that a heat transfer fluid can circulate through both. The system preferably includes one or more pumps for circulating the heat transfer fluid. The system preferably includes one or more temperature probes for measuring one or more temperatures in the system. The one or more temperature probes may measure the temperature of an electrochemical cell, a heat transfer fluid, a heat providing component, a heat removing component, an ambient temperature, a battery temperature storage device, a thermal energy storage material, or any combination thereof. The system preferably includes one or more valves on one or more of the lines so that the flow of the heat transfer fluid to the heat providing component can be started or stopped, the flow of the heat transfer fluid to the heat removing component can be started or stopped, or both. The system may optionally include one or more heaters, such as an electric resistance heater. The electrical resistance heater, if present, may be employed to generate heat for heating the heat providing component. The system preferably includes one or more controllers. The controller may control the flow of the heat transfer fluid to the heat providing component, the flow of the heat transfer fluid to the heat removing component, or both. The controller may control one or more valves, one or more pumps, one or more heaters, or any combination thereof. The system may include one or more means of insulating the heat providing component, one or more (e.g., all) of the lines connecting the heat providing component to the battery temperature regulating device, or any combination thereof.

Heat Providing Component/Heat Storage Device

The battery temperature regulating system preferably includes a heat providing component for providing heat to the battery temperature regulating device. The heat providing component may be any component that is capable of heating the heat transfer fluid so that heat can be transferred to the electrochemical cells in the battery temperature regulating device. Suitable heat providing components may store heat, transfer heat from one or more other components, or both. The heat providing component, if employed, preferably consists essentially of or includes a heat storage device that efficiently stores thermal energy for heating the battery temperature regulating device. The heat storage device may be external of the battery temperature regulating device, or may be integrated into the battery temperature device. The heat storage device is capable of storing a relatively high density of thermal energy (e.g., as measured in $J/m^3$) based on the total volume of the device (e.g., excluding any insulation). For example, the heat storage device may be capable of storing a density of thermal energy greater than, preferably at least 20 percent greater than, and more preferably at least 50 percent greater than the battery temperature regulating device.

The heat storage device is preferably at least partially insulated so that the rate of heat loss from the heat storage device is reduced or minimized. Any of the insulation described for the battery temperature regulating device may be employed for insulating the heat storage device.

By employing a heat storage device, it may be possible to reduce or eliminate the insulation of the battery temperature regulating device. For example, it may be more efficient to insulate the heat storage device (which may be relatively small in volume as it generally does not contain the one or more electrochemical cells) than to insulate the battery temperature regulating device (which may be relatively large in volume).

The heat storage device preferably includes one or more heat transfer fluid compartments and one or more thermal energy storage material compartments.

A thermal energy storage material compartment of the heat storage device may be any thermal energy storage material compartment described herein for the battery temperature regulating device. Preferably the thermal energy storage material compartment of the heat storage device includes one or more thermal energy storage materials in a structure that isolates the thermal energy storage material from the heat transfer fluid compartment. The thermal energy storage material may be encapsulated in one or more cells or capsules. For example, the thermal energy storage material may be provided in more layers of capsules, such as one or more blister packs.

A large portion of the volume of the heat storage device may be occupied by the thermal energy storage material so that the power output of the heat storage device is relatively high, the total volume of the heat storage device is relatively small, or both. For example, the ratio of the volume of the heat transfer fluid compartment to the volume of the thermal energy storage material (e.g., the phase change material) in the heat storage device may be less than about 20:1 (preferably less than about 10:1, more preferably less than about 5:1, even more preferably less than about 2:1 and most preferably less than about 1:1). The heat storage device may have a heat transfer fluid compartment sufficiently large to efficiently remove heat from the heat storage device, preferably without excessive hydraulic resistance. For example, the ratio of the volume of the heat transfer fluid compartment to the volume of the thermal energy storage material (e.g., the phase change material) in the heat storage device preferably is at least about 1:200, more preferably at least about 1:100, even more preferably at least about 1:50, and most preferably at least about 1:25.

The heat storage device may contain a sufficient quantity of the thermal energy storage material so that an object to be heated (such as the electrochemical cells in a battery temperature regulating device) can be heated to a desired temperature. For example, the heat storage device may contain sufficient quantity of thermal energy storage material to increase the temperature of a battery temperature regulating device by at least 10° C., preferably at least about 20° C., more preferably at least about 30° C., and most preferably at least about 40° C.

Figure 5:
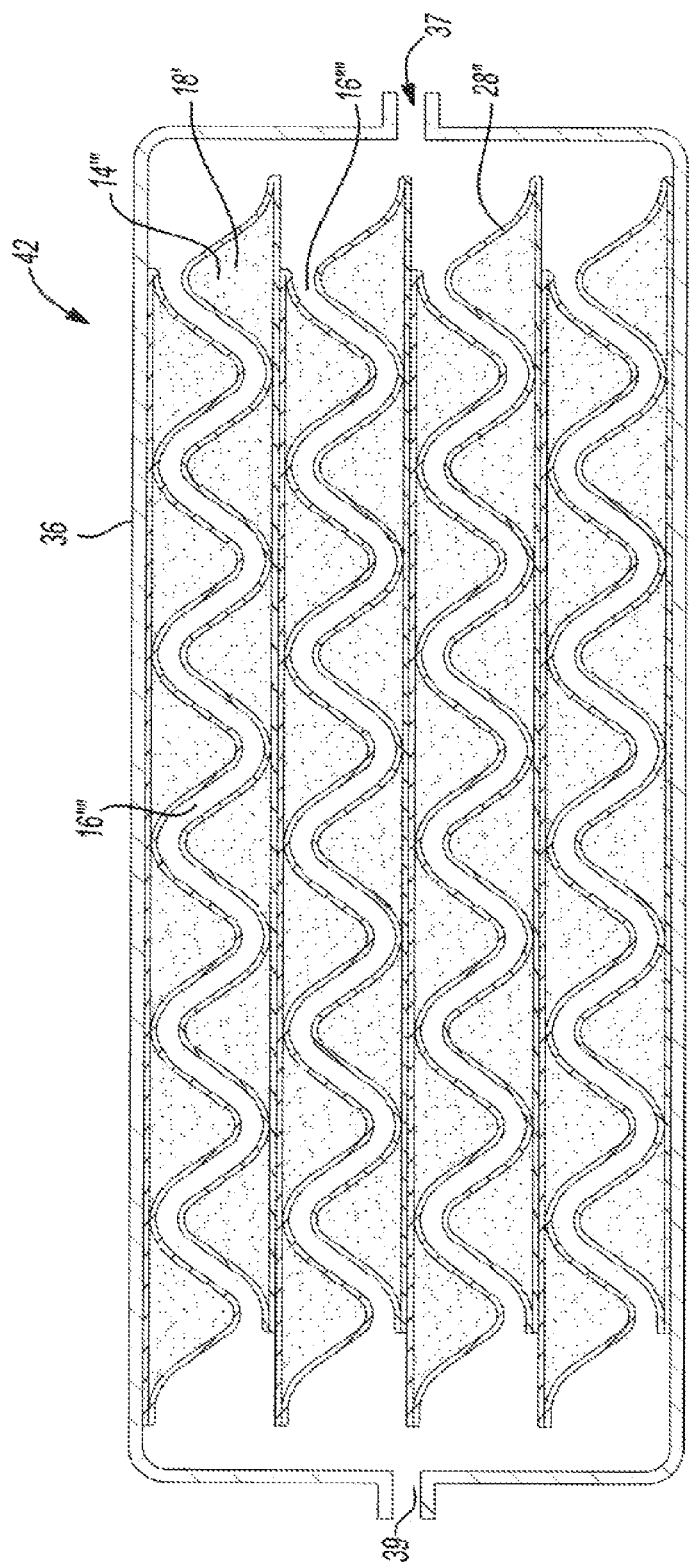
FIG. 5 is a portion of a cross-section of an illustrative heat storage device.
Figure 6:
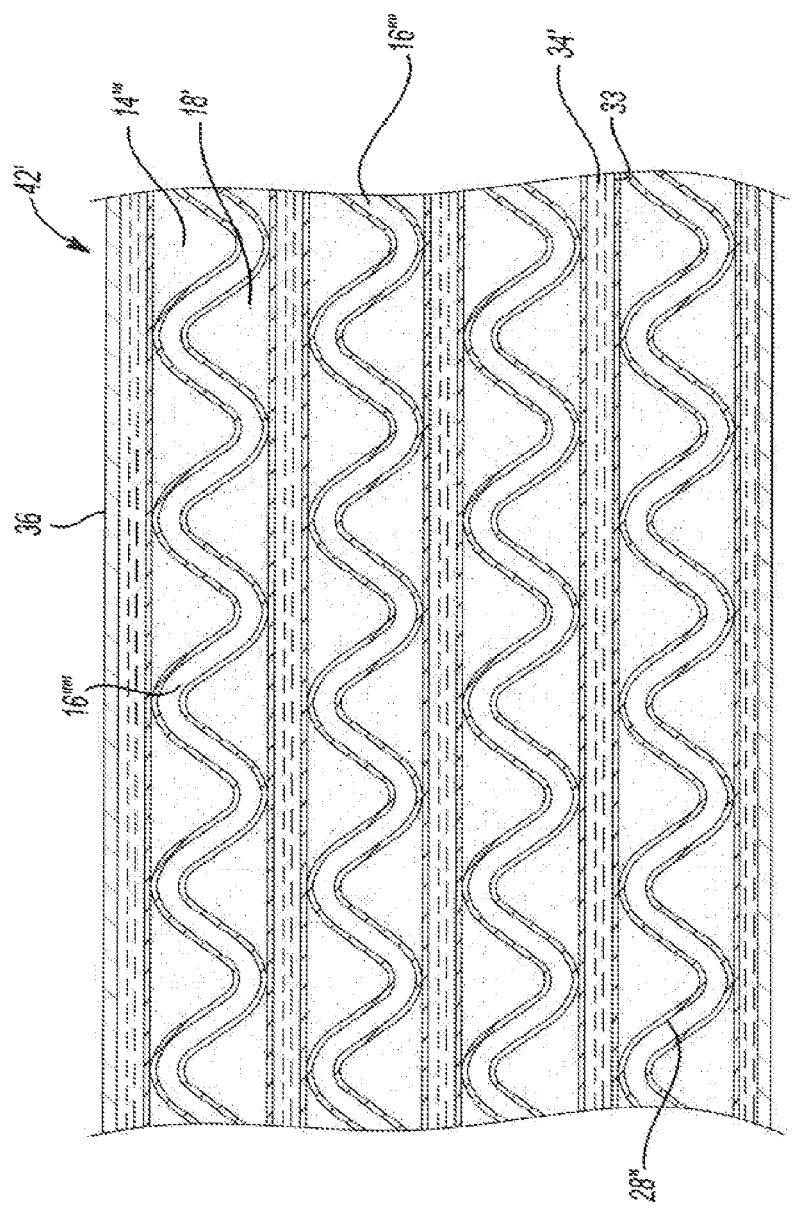
FIG. 6 is a portion of a cross-section of an illustrative heat storage device.

FIG. 5 and FIG. 6 illustrate cross-sections of two heat storage devices 42, 42'. The heat storage devices includes a thermal energy storage material 18' encapsulated in a plurality of blister packs 28'''. The blister packs are arranged so that a heat transfer fluid compartment 16'''', 16''''' is in thermal communication with the capsules. The blister packs have a generally flat surface and an arcuate surface. As illustrated In FIG. 5, the heat transfer fluid compartment 16'''' may include the space between two arcuate surfaces of adjacent blister packs. As illustrated in FIG. 6, the heat transfer fluid compartment 16''''' may include the space between two generally flat surfaces of adjacent blister packs. As shown In FIG. 6, the heat transfer fluid compartment may optionally include a capillary structure 33 so that a heat transfer fluid (e.g., a working fluid 34) can be pumped through the heat transfer fluid compartment using capillary forces. Examples of capillary structures and systems employing a capillary pumped loop are described in PCT Patent Application No. PCT/US09/67823 filed on Dec. 14, 2009 by Soukhojak et al., incorporated herein by reference in its entirety. For example, the capillary structure may have an average pore radius less than about 2 mm, preferably less than about 1 mm, more preferably less than about 400 µm, even more preferably less than about 100 µm, even more preferably less than about 30 µm, even more preferably less than about 20 µm, and most preferably less than about 10 µm. The heat storage device includes one or more inlets 37 so that the heat transfer fluid can flow into the heat storage device. The heat storage device includes one or more outlets 39 so that the heat transfer fluid can flow out of the heat storage device. The heat storage device preferably is partially or completely insulated with one or more means of insulation. Sufficient insulation preferably is used so that the heat storage device loses heat to the ambient at a relatively low rate. As illustrated in FIG. 5 and FIG. 6, the insulation 36 may include an evacuated chamber. As illustrated in FIG. 6, the heat transfer fluid employed in the heat storage device may optionally be a working fluid 34.

The thermal energy storage material employed in the heat storage may be any thermal energy storage material described herein for use in the battery temperature regulating device. The thermal energy storage material of the heat storage device may be the same as the thermal energy storage material of the battery temperature regulating device. The thermal energy storage material of the heat storage device may be different from the thermal energy storage material of the battery temperature regulating device. For example, the heat storage device may employ a thermal energy storage material having a different transition temperature (e.g., liquidus temperature, melting temperature, or eutectic temperature) than the transition temperature of the thermal energy storage material employed in the battery temperature regulating device. Preferably the heat storage device employs a thermal energy storage material having a relatively high transition temperature. For example the heat storage device may include a thermal energy storage material having a transition temperature higher than the transition temperature of the thermal energy storage material in the battery temperature regulating device. In a particular aspect of the invention, the heat storage device may include a thermal energy storage material having a transition temperature greater than about 60° C., greater than about 80° C., or greater than about 100° C. The heat storage device may include a thermal energy storage material having a transition temperature less than about 350° C., less than about 250° C., less than about 200° C., or less than about 150° C.

Lines/Connections between Temperature Regulating Device and Heat Storage Device

As discussed above, the system preferably includes heat transfer fluid lines for circulating the heat transfer fluid. The lines may connect two or more components (e.g., a heat removing component or a heat providing component, and a battery temperature regulating device) so that a circulating loop is formed. The lines preferably do not leak or crack at the temperatures and pressures of the heat transfer fluid. The lines preferably are made of a material that substantially or entirely resists corrosion from the heat transfer fluid. The system may employ the lines for containing the heat so that it may flow without leaking.

Heat Transfer Fluid Working Fluid

The heat transfer fluid used to heat and/or cool the one or more electrochemical cells may be any liquid or gas so that the fluid flows (e.g., without solidifying) through the battery temperature regulating device and the other components (e.g., the heat providing component, one or more connecting tubes or lines, the heat removing component, or any combination thereof) through which it circulates when it is cold. The heat transfer fluid may be any art known heat transfer fluid or coolant that is capable of transferring heat at the temperatures employed in the battery temperature regulating system. The heat transfer fluid may be a liquid or a gas. Preferably, the heat transfer fluid is capable of flowing at the lowest operating temperature that it may be exposed to during use (e.g., the lowest expected ambient temperature). For example, the heat transfer fluid may be a liquid or gas at a pressure of about 1 atmosphere pressure and a temperature of about 25° C., preferably about 0° C., more preferably −20° C., and most preferably at about −40° C. Without limitation, a preferred heat transfer fluid for heating and/or cooling the one or more electrochemical cells is a liquid at about 40° C.

The heat transfer fluid should be capable of transporting a large quantity of thermal energy, typically as sensible heat. Suitable heat transfer fluids may have a specific heat (measured for example at about 25° C.) of at least about 1 J/g·K, preferably at least about 2 J/g·K, even more preferably at least about 2.5 J/g·K, and most preferably at least about 3 J/g·K. Preferably the heat transfer fluid is a liquid. For example, any art known engine coolant may be employed as the heat transfer fluid. The system may employ a single heat transfer fluid for heating the electrochemical cells and for cooling the electrochemical cells. Alternatively, the system may employ a first heat transfer fluid for heating the electrochemical cells and second heat transfer fluid for cooling the electrochemical cells.

Without limitation, heat transfer fluids which may be used alone or as a mixture include heat transfer fluids known to those skilled in the art and include fluids containing water, one or more alkylene glycols, one or more polyalkylene glycols, one or more oils, one or more refrigerants, one or more alcohols, one or more betaines, or any combination thereof. The heat transfer fluid may include (e.g., in addition to or in lieu of the aforementioned fluids) or consist essentially of a working fluid such as one described hereinafter. Suitable oils which may be employed include natural oils, synthetic oils, or combinations thereof. For example, the heat transfer fluid may contain or consisting substantially (e.g., at least 80 percent by weight, at least 90 percent by weight, or at least 95 percent by weight) of mineral oil, caster oil, silicone oil, fluorocarbon oil, or any combination thereof.

A particularly preferred heat transfer fluid includes or consists essentially of one or more alkylene glycols. Without limitation, suitable alkylene glycols include from about 1 to about 8 alkoxy groups. For example the alkylene glycol may include alkoxy groups containing from about 1 to about 6 carbon atoms. The alkoxy groups in a alkylene glycol molecule may be the same or may be different. Optionally, the alkylene glycol may include a mixture of different alkylene glycols each containing different alkoxy groups or different ratios of alkoxy groups. Preferred alkoxy groups include ethylene oxide, propylene oxide, and butylene oxide. Optionally, the alkylene glycol may be substituted. For example the alkylene glycol may be substituted with one or two alkyl groups, such as one or two alkyl groups containing about 1 to about 6 carbon atoms. As such, the alkylene glycol may include or consist essentially of one or more alkylene glycol monolkyl ethers, one or more alkylene glycol dialkyl ethers, or combinations thereof. The alkylene glycol may also include a polyalkylene glycol. Particularly preferred alkylene glycols include ethylene glycols, diethylene glycol, propylene glycol, and buylene glycol. Any of the above glycols may be used alone or as a mixture. For example, the glycol may be employed as a mixture with water. Particularly preferred heat transfer fluids include mixtures consisting substantially (e.g., at least 80 weight percent, at least 90 weight percent or at least 96 weight percent based on the total weight of the heat transfer fluid) or entirely of a mixture of a glycol and water. The concentration of water in the mixture preferably is greater than about 5 weight percent, more preferably greater than about 10 weight percent, even more preferably greater than about 15 weight percent, and most preferably greater than about 20 percent based on the total weight of the heat transfer fluid. The concentration of glycol in the mixture preferably is greater than about 5 weight percent, more preferably greater than about 10 weight percent, even more preferably greater than about 15 weight percent, and most preferably greater than about 20 percent based on the total weight of the heat transfer fluid.

Optionally, the heat transfer fluid for heating and/or cooling the one or more electrochemical cells may include or consist substantially entirely of a working fluid. For example, the system may include a working fluid that flows through the heat storage device where it is heated and evaporates and then to the battery temperature regulating device (i.e., through a first heat transfer fluid compartment) where it condenses. As such, the heat storage device may function as an evaporator for the working fluid and the battery temperature regulating device may function as a condenser for the working fluid. If a working fluid is employed, the heat provided to the condenser (e.g., to the battery temperature regulating device) preferably includes the heat of vaporization of the working fluid. The system may include a cold line for returning the working fluid to heat storage device, and a heat line for removing working fluid from the heat storage device. The cold line and the heat line preferably are capable of containing the working fluid of without leaking as it is flows through a loop. When the heat storage device (e.g., the thermal energy storage material in the heat storage device) is at a temperature sufficient to cause the combined vapor pressure of all components of the working fluid to exceed about 1 atmosphere and a valve is opened to allow the flow of the working fluid, the working fluid may be a) pumped by a capillary structure; b) at least partially vaporized; c) at least partially transported to the condenser; and d) at least partially condenses in the condenser; so that heat is removed from the heat storage device. As such, the system may optionally include a capillary pumped loop.

Working Fluids

The working fluids may be any fluid that can partially or completely evaporate (transition from a liquid to a gaseous state) in the heat storage device when the thermal energy storage material is at or above its liquidus temperature. Without limitation, exemplary working fluids may include or consist essentially of one or more alcohols, one or more ketones, one or more hydrocarbons, a fluorocarbon, a hydrofluorocarbon (e.g., an art known hydrofluorocarbon refrigerant, such as an art known hydrofluorocarbon automotive refrigerant), water, ammonia, or any combination thereof.

Suitable working fluids (e.g., for the capillary pumped loop) include pure substances and mixtures having one or any combination of the following characteristics: a good chemical stability at the maximum thermal energy storage system temperature, a low viscosity (e.g., less than about 100 mPa·s), good wetting of the capillary structure (e.g., good wick wetting), chemical compatibility with (e.g., the working fluid causes low corrosion of) the materials of the capillary pumped loop (such as the container material, the materials employed to encapsulate the thermal energy storage material, the materials of the vapor and liquid lines, and the like), a temperature dependent vapor pressure that is conducive to both the evaporator and the condenser temperatures, a high volumetric latent heat of vaporization (i.e., the product of the latent heat of fusion and the density of the working fluid at about 25° C. in units of joules per liter), or a freezing point less than or equal to the freezing point of the heat transfer fluid of the condenser (e.g., a freezing point less than or equal to the freezing point of antifreeze, a freezing point less than or equal to about −40° C., or both). For example, the equilibrium state of the working fluid may be at least 90 percent liquid at a temperature of −40° C. and a pressure of 1 atmosphere.

The vapor pressure of the working fluid should be high enough in the evaporator so that a vapor stream is produced that is sufficient to pump the working fluid. Preferably, the vapor pressure of the working fluid should be high enough in the evaporator so that a vapor stream is produced that is sufficient to carry the desired thermal power measured in watts from the evaporator to the condenser. The vapor pressure of the working fluid in the evaporator preferably is sufficiently low so that the capillary pumped loop does not leak and does not rupture.

The wetting of the working fluid to the capillary structure may be characterized by a contact angle of the working fluid on the material of the capillary structure. Preferably, the contact angle is less than about 80°, more preferably less than about 70°, even more preferably less than about 60°, and most preferably less than about 55°.

The working fluid preferably condenses at moderate pressures at temperatures below about 90° C. For example, the working fluid may condense at about 90° C. at a pressure less than about 2 MPa, preferably less than about 0.8 MPa, more preferably less than about 0.3 MPa, even more preferably less than about 0.2 MPa, and most preferably less than about 0.1 MPa.

The working fluid preferably can flow at very low temperatures. For example, the working fluid may be exposed to very low ambient temperatures and preferably is capable of flowing from the condenser to the heat storage device at a temperature of about 0° C., preferably about −10° C., more preferably about −25° C., even more preferably about −40° C., and most preferably about −60° C. The working fluid preferably is in a gas state when it is at a temperature of the fully charged heat storage device. For example, the working fluid may have a boiling point at 1 atmosphere less than the phase transition temperature of the thermal energy storage material in the heat storage device, preferably at least 20° C. less than the phase transition temperature of the thermal energy storage material, and more preferably at least 40° C. less than the phase transition temperature of the thermal energy storage material. In various aspects of the invention, it may be desirable for the working fluid to have a boiling point at 1 atmosphere (or the temperature at which the combined vapor pressure of all of the components of the working fluid is equal to 1 atmosphere may be) greater than about 30° C., preferably greater than about 35° C., more preferably greater than about 50° C., even more preferably greater than about 60° C., and most preferably greater than about 70° C. (e.g., so that the working fluid is a liquid at ambient conditions). In various aspects of the invention, the boiling point at 1 atmosphere of the working fluid may be (or the temperature at which the combined vapor pressure of all of the components of the working fluid is equal to 1 atmosphere may be) less than about 180° C., preferably less than about 150° C., more preferably less than about 120° C., and most preferably less than about 95° C.

A particularly preferred working fluid includes or consists substantially of water and ammonia. For example the combined concentration of water and ammonia in the working fluid may be at least about 80 weight percent, more preferably at least about 90 weight percent, and most preferably at least about 95 weight percent based on the total weight of the working fluid) water and ammonia. The concentration of ammonia may be sufficient to keep the boiling point of the working fluid below the boiling point of water (e.g., at least 10° C. below the boiling point of water). The concentration of ammonia may be greater than about 2 weight percent, preferably greater than about 10 weight percent, more preferably greater than about 15 weight percent and most preferably greater than about 18 weight percent based on the total weight of the working fluid. The concentration of ammonia may be less than about 80 weight percent, preferably less than about 60 weight percent, more preferably less than about 40 weight percent and most preferably less than about 30 weight percent based on the total weight of the working fluid. The concentration of water in the working fluid may be greater than about 20 weight percent, preferably greater than about 40 weight percent, more preferably greater than about 60 weight percent and most preferably greater than about 70 weight percent based on the total weight of the working fluid. The concentration of water in the working fluid may be less than about 98 weight percent, preferably less than about 95 weight percent, more preferably less than about 90 weight percent, even more preferably less than about 85 weight percent, and most preferably less than about 82 weight percent based on the total weight of the working fluid. For example a solution of about 21 weight percent ammonia and about 79 weight percent water has a liquidus point of about −40° C. and the upper limit of a boiling range at 1 atmosphere of less than about 100° C. This solution may be stored (e.g., as a liquid) in a non-pressurized container at room temperature.

Preferably the working fluid has a combined vapor pressure of all of its components equal to 1 atmosphere at one temperature from about 0° C. to about 250° C.

The working fluid is capable of efficiently transferring thermal energy from the heat storage device so that the amount of working fluid needed to remove an amount of heat from the heat storage device is relatively small (e.g., compared to a device that uses a heat transfer fluid that is not a working fluid to remove the heat). Preferably a large portion of the heat transferred by the working fluid is transferred in the form of heat of vaporization. The volume of working fluid, the flow rate of the working fluid, or both, may be relatively low in the thermal energy storage compared to a system that employs a heat transfer fluid that is not a working fluid and has the same initial power. The flow rate of the working fluid (i.e., the working fluid in the liquid state flowing into the heat storage device) per liter of the container of the heat storage device may be less than about 5 liters/min, preferably less than about 2 liters/min, more preferably less than about 1 liter/min, even more preferably less than about 0.5 liters/min, and most preferably less than about 0.1 liters/min. The ratio of the volume of the working fluid in the system to the total volume in the container of the heat storage device, or to the volume of the thermal energy storage material in the heat storage device should be sufficiently low so that the total weight of the system is not excessively impacted by the weight of the working fluid. The ratio of the volume of the working fluid in the system (e.g., in the capillary pumped loop) to the total volume of the container (i.e., the volume inside the container) of the heat storage device (or even the ratio of the volume of the working fluid in the system to the volume of the thermal energy storage material in the heat storage device) may be less than about 20: preferably less than about 10, more preferably less than about 4, even more preferably less than about 2, and most preferably less than about 1.

As described above, the working fluid may transfer some of the thermal energy in the form of heat of heat of vaporization. The working fluid preferably has a high heat of vaporization so that the amount of heat that can be transferred is high. Suitable working fluids for the heat storage device may have a heat of vaporization greater than about 200 kJ/mole, preferably greater than about 500 kJ/mole, more preferably greater than about 750 kJ/mole, even more preferably greater than about 1000 kJ/mole, and most preferably greater than about 1200 kJ/mole.

In applications where the temperature of the working fluid may be less than 0° C., the working fluid preferably is not water (e.g., so that the working fluid does not freeze, cause a rupture, or both).

It will be appreciated that the materials that contact with the working fluid may be resistant to corrosion from the working fluid. For example, any one or all of the surfaces of the heat storage device or the battery temperature regulating system that may come in contact with the working fluid (e.g., the interior of the working fluid vapor line, the interior of the working fluid liquid line, the surfaces of the heat transfer fluid compartment of the heat storage device, the interior surfaces of one or more valves, the surface of a working fluid compartment in the condenser, the interior surface of a working fluid reservoir, and the like) may be made of stainless steel.

It will be appreciated that any of, the working fluids or heat transfer fluids employed in the thermal energy storage system described herein may include an additives package. For example the additives package may include a stabilizer, a corrosion inhibitor, a lubricant, an extreme pressure additive, or any combination thereof.

Valves/Diverters

The battery temperature regulating system may include one or more valves or other art known means for controlling the flow path of the heat transfer fluid. The system may include a valve which when opened allows the heat transfer fluid to flow through a component that provides heat to the battery temperature regulating device and when closed prevents flow through the component. For example, the system may include one or more valves for opening and shutting the circulation of the heat transfer fluid through a heat storage device. The system may include a valve which when opened allows the heat transfer fluid to flow through a component that removes heat from the battery temperature regulating device and when closed prevents flow through the component. For example, the system may include one or more valves for opening and shutting the circulation of the heat transfer fluid through a heat transfer device, such as a radiator. It will be appreciated that one or more valves single valve may be employed for diverting the flow of the heat transfer fluid from the component that provides heat to the component that removes heat. For example, the system may include a diverter valve that has a first position for circulating the heat transfer fluid through the component that provides heat and a second position for circulating the heat transfer fluid through the component that removes heat. It will be appreciated that a diverter valve may also allow for circulating the heat transfer fluid to flow to both the heat providing component and the heat removing component, and for controlling the relative rates of the two flows. The system may also include one or more valves for stopping and starting the flow of the heat transfer fluid through the battery temperature regulating device.

Heat Receiving Component/Heat Exchanger

The system includes a heat receiving component for receiving heat from the battery temperature regulating device. The heat receiving component may have a heat transfer fluid compartment so that the heat transfer fluid can flow into one or more inlets through the heat receiving component, and out one or more outlets. The heat receiving component may function by removing heat from the heat transfer fluid so that the temperature of the heat transfer as it flows through the outlet is lower than the temperature as it flows into the inlet. The heat receiving component may transfer some or all of the heat it receives from the heat transfer fluid to a heat sink or to another fluid. As such, the heat receiving component may be a heat exchanger. A heat exchanger may transfer the heat for a second heat transfer fluid, which may be a liquid or gas. The heat exchanger may employ a second heat transfer fluid that is the same or different from the heat transfer fluid that removes heat from the battery temperature regulating device. Preferably the second heat transfer fluid is a coolant (such as a coolant in a vehicle) or air. For example, the heat exchanger may be a radiator having a large surface area in contact with air. The radiator may transfers heat from the battery temperature regulating device (via a heat transfer fluid) to the air surrounding the radiator. As another example, the heat exchanger may transfer heat to a liquid such as to a coolant fluid that is then circulating (e.g., to a radiator).

It will be appreciated that instead of employing a heat receiving component, the battery temperature regulating device may be cooled by flowing an air stream through the device. Such an air stream may optionally employ a fan, a blower, a damper, or any combination thereof to regulate the flow of the air.

Controller

The system preferably includes one or more controllers. The controller may be employed to control the flow of heat transfer fluid to a heat receiving component. The controller may be employed to control the flow of heat transfer fluid to from a heat providing component. The controller may control a heater, such as a heater located in the heat providing component or in thermal communication with the heat providing component. The controller may control one or more pump that pumps a heat transfer fluid. For example, the controller may control when a pump starts, stops, increase its pumping rate, decrease its pumping rate, or any combination thereof. The controller may monitor one or more preselected conditions such as one or more temperatures of the system. The controller may monitor a temperature of the one or more electrochemical cells, the heat transfer fluid, the battery temperature regulating device, a thermal energy storage material, an ambient condition, or any combination thereof. The controller may monitor one or more preselected conditions related to a heat flux, such as the amount of heat being produced by the electrochemical cells, the amount of heat being removed from the battery temperature regulating device (e.g., through dissipation, through a heat transfer fluid, or both), the amount of heat being provided by a heat transfer fluid, or any combination thereof. For systems employed in a vehicle, the controller may monitor one or more preselected conditions related to whether the vehicle is in operation, whether the vehicle is accelerating, whether the vehicle is decelerating, whether the vehicle is parked, whether the vehicle is plugged into an external source of electricity, a time when the vehicle is expected to be in operation, an ambient temperature forecast, or any combination thereof. The controller may compare the measured values of the one or more preselected conditions with a predetermined value. The comparison may be used by the controller for determining whether (and possibly the extent to which) one or more valves are to be opened or closed, whether one or more pumps are to be operated, whether electric current is to be provided to an electric heater or any combination thereof.

The battery temperature regulating system may optionally include one or more heaters. The heater may be any heater that is capable of increasing the temperature of the thermal energy storage material in the heat storage device to a temperature above its transition temperature. The heater may be any heater that converts energy (e.g., electrical energy, mechanical energy, chemical energy, or any combination thereof) into heat (i.e., thermal energy). The one or more heaters may be one or more electric heaters. The one or more heaters may be employed to heat some or all of the thermal energy storage in the battery temperature regulating system. For example the heater may be employed to heat thermal energy storage material in a heat storage device, to heat thermal energy storage material in a battery temperature regulating device, or both. Preferably the system includes one or more heaters that are in thermal communication with a heat storage device. For example, the system may include one or more heaters within the insulation of a heat storage device. An electric heater may employ electricity from the electrochemical cells, from an external source, or both. For example, when a vehicle is plugged into an outlet connected to a stationary object, the heat storage device may be maintained at a temperature above the liquidus temperature of the thermal energy storage material in the heat storage device using the electricity form an external source. When the vehicle is not plugged into an outlet connected to a stationary object, the heat storage device may be maintained at a temperature above the liquidus temperature of the thermal energy storage material in the heat storage device using electricity generated by the electrochemical cell.

The use of an electric heater to heat a heat storage device which later is employed to heat the electrochemical cells is found to have advantages such as having a higher efficiency, requiring less insulation, or both, compared to directly heating the electrochemical cells with the heat from an electric heater.

Figure 7:
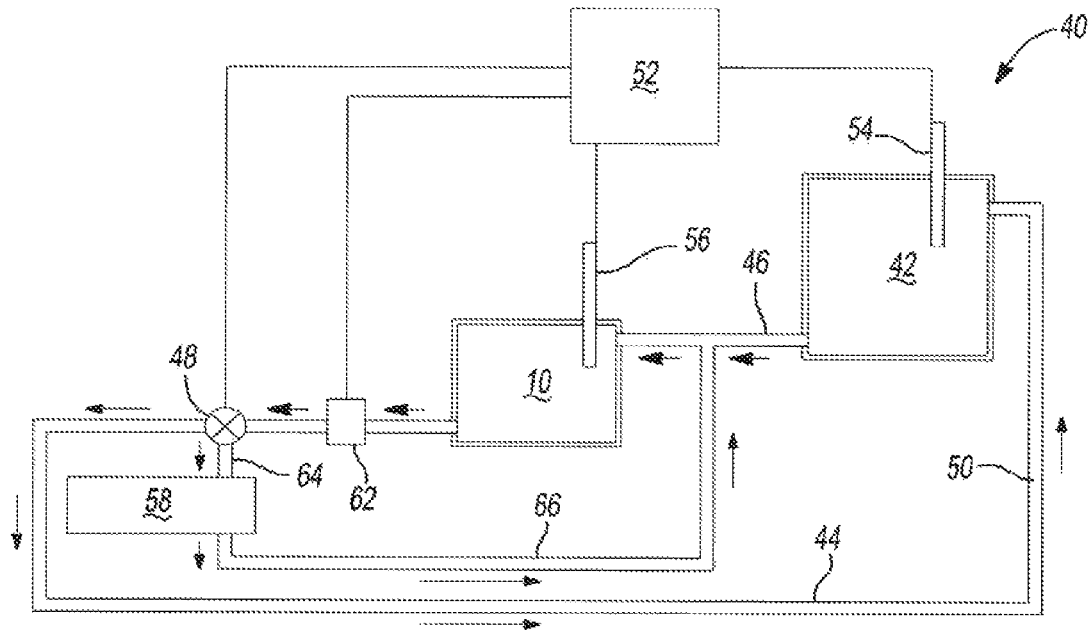
FIG. 7 is a schematic of a battery temperature regulating system.

As illustrated in FIG. 7, the battery temperature regulating system 40 may include a battery temperature regulating device 10 that is connected to a heat storage device 42 and to a heat exchanger, such as a radiator 58 by one or more lines for flowing circulating a heat transfer fluid 50. The heat transfer fluid may exit the battery temperature regulating device and split into a radiator delivery line 64 that leads to the radiator 58 and a heat storage device delivery line 46 that leads to the heat storage device 42. The system includes one or more valves, such as a diverter valve 48 for regulating how much of the flow of the heat transfer fluid 50 goes into the radiator 58 relative to the heat storage device 42. The heat transfer fluid 50 exiting the heat storage device 42 may return to the battery temperature regulating device 10 through a heat storage device return line 44. The heat transfer fluid 50 exiting the radiator 58 may return to the battery temperature regulating device 10 through a radiator return line 66. The two return lines 44, 66 may join together. As illustrated in FIG. 7, the system may also include one or more temperature probes, 54, 56. For example, the system may include an electrochemical cell probe 56 for measuring a temperature of the battery temperature regulating device, a heat storage device temperature probe 54, or both. The heat storage device temperature probe 54 may be used for measuring a temperature of the thermal energy storage material in the heat storage device 42. The system 40 preferably includes a pump 62 or other means of circulating the heat transfer fluid. The system 40 may also include one or more controllers 52. The controller 52 may control the pump 62 for regulating the rate at which the heat transfer fluid is pumped, or to prevent the heat transfer fluid from circulating. The controller 52 may control the one or more valves, such as the diverter valve 48 for controlling the flow of the heat transfer fluid 50 to the heat storage device 42 and the radiator 58.

Figure 8A:
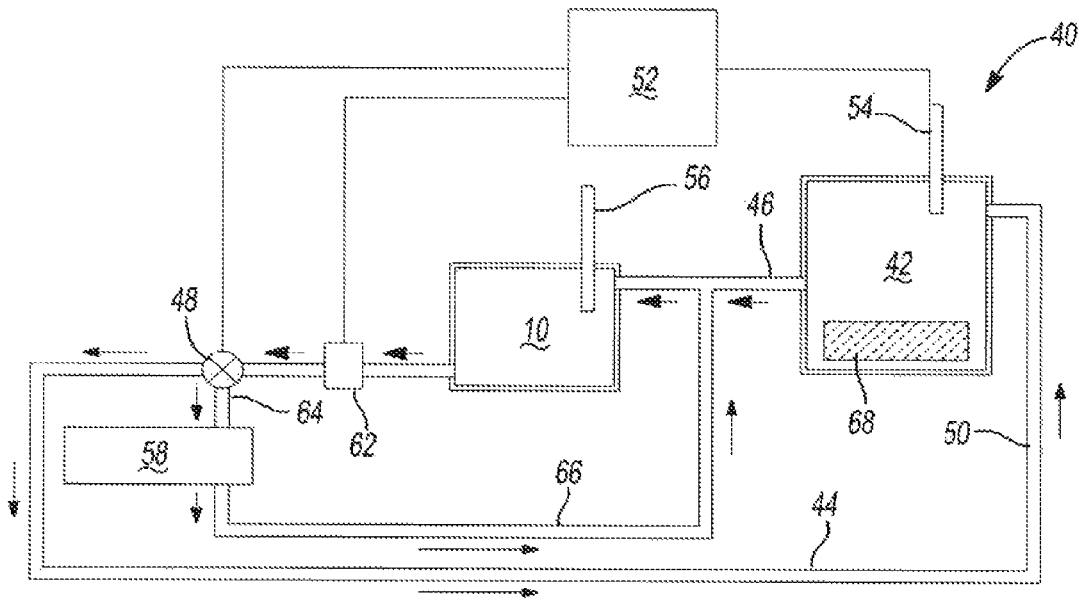
FIG. 8A is a schematic of a battery temperature regulating system.

As illustrated in FIG. 8A, the system 40' may include an electric heater 68 that is in thermal communication with the heat storage device 42. For example, the electric heater 68 may be inside or adjoining the heat storage device 42. Preferably the electric heater 68 is inside the insulation, so that, insulation is generally not interposed between the electric heater and the heat storage device.

Figure 8B:
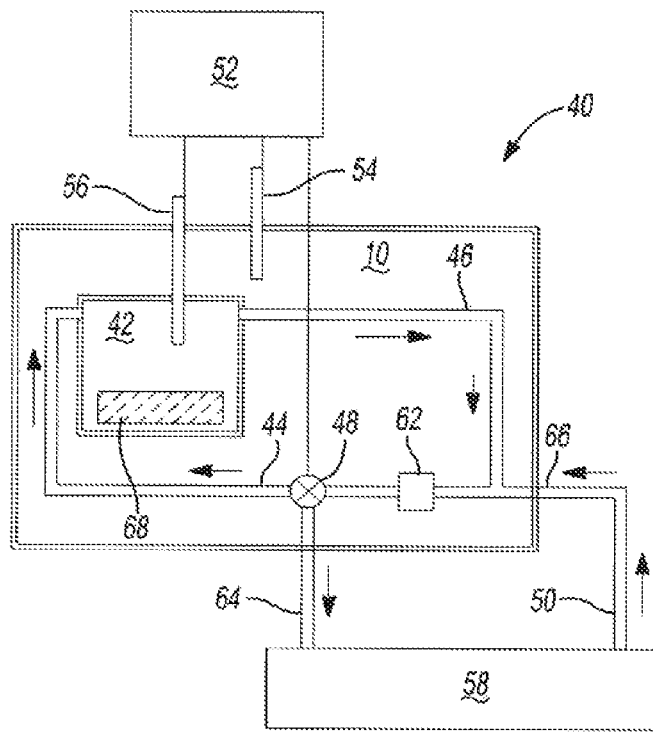
FIG. 8B is a schematic of a battery temperature regulating system.

With reference to FIG. 8B, the system 40''' may include a heat storage device that is integrated into the battery temperature regulating device. Such a configuration may minimize thermal losses to the environment while the heat storage device is storing heat, while the heat storage device is discharging heat to the heat the electrochemical cells, or both.

Figure 9:
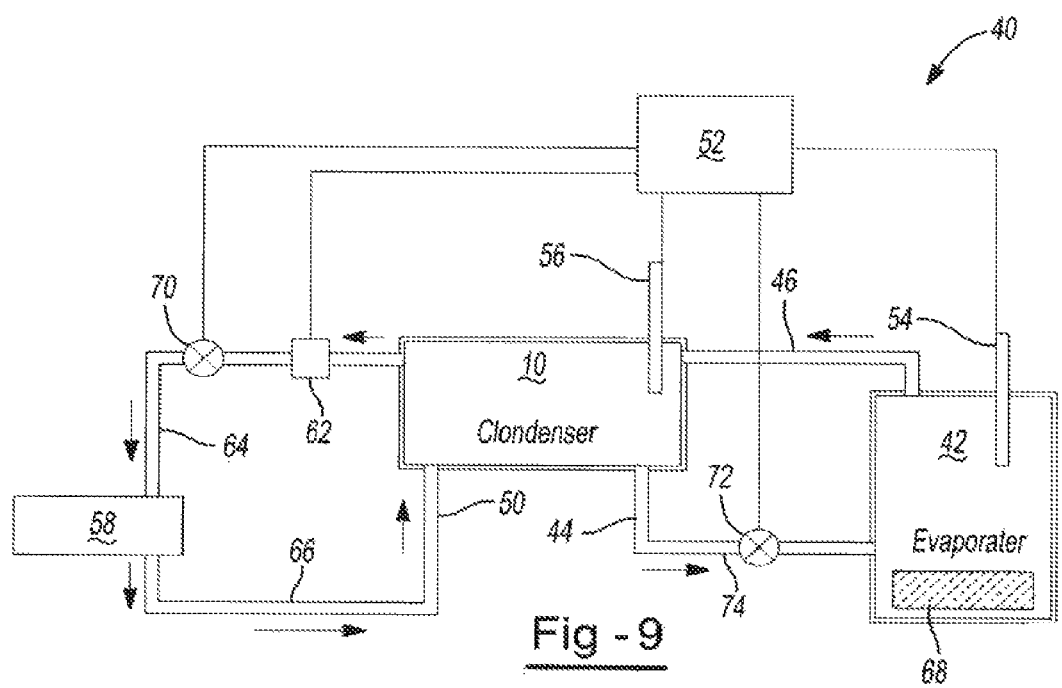
FIG. 9 is a schematic of a battery temperature regulating system.

As illustrated in FIG. 9, the system 40''' may include a means of independently circulating a first heat transfer fluid 50 and a second heat transfer fluid 74 through a battery temperature regulating device 10. The battery temperature regulating device 10 is connected to a radiator 58 by a radiator delivery line 64 and a radiator return line 66. The first heat transfer fluid 50 circulates through the radiator delivery line 64 and the radiator return line 66 so that heat may be removed from the battery temperature regulating device 10 and is transferred to the radiator 59. The battery temperature regulating device 10 is connected to a heat storage device 42 by a heat storage device delivery line 44 and a heat storage device return line 46. The second heat transfer fluid 74 circulates through the heat storage device delivery line 64 and the heat storage device return line 66 so that heat may be provided to the battery temperature regulating device 10 from the heat storage device 42. The second heat transfer fluid 74 may be a working fluid and the heat storage device may include a capillary structure, so that the working fluid flows is pumped into the heat storage device by capillary forces. As such, the heat storage device may optionally be an evaporator for the working fluid and the battery temperature regulating device may be a condenser for the working fluid. The system may include one or more valves 70 and a pump 62 for controlling the flow rate of the first heat transfer fluid. The system may include one or more valves 72 and optionally a pump (not shown) for controlling the flow rate of the second heat transfer fluid.

Operation of System

The devices and systems described herein may be employed in a process for managing the temperature of an electrochemical cell. The process may include a step of maintaining the battery temperature in the battery temperature regulating device at or above a minimum target temperature, at or below a maximum target temperature, or both (i.e., within a target temperature range). While the battery temperature is within the target temperature range, the heat transfer fluid may not circulate or circulate through the battery temperature regulating device at a relatively low rate. Preferably, when the battery temperature is within the target temperature range, the heat transfer fluid does not circulate through the battery temperature regulating device. When the battery temperature is greater than the maximum target temperature the battery temperature regulating device may be cooled. As such, when the battery temperature is greater than the maximum target temperature, a heat transfer fluid may circulate through the battery temperature regulating device and remove heat from the device. For example, a heat transfer fluid may circulate through the battery temperature regulating device until the battery temperature reaches a maximum cutoff temperature. The cooling cycle cutoff temperature may be the maximum target temperature or may be a temperature less than the maximum target temperature. For example the cooling cycle cutoff temperature may be a temperature between the minimum and maximum target temperatures. When the battery temperature is less than the target temperature, the battery temperature regulating device may be heated. As such, when the battery temperature is less than the target temperature a heat transfer fluid may circulate through the battery temperature regulating device to provide heat to the device. For example a heat transfer fluid may circulate through the battery temperature device until the battery temperature reaches a heating cycle cutoff temperature. The heating cycle cutoff temperature may be the minimum target temperature or may be a temperature less than the minimum target temperature. For example, the heating cycle cutoff temperature may be a temperature between the minimum and maximum target temperatures.

It will be appreciated that during charging of an electrochemical cell, during discharging of an electrochemical cell, or both, heat may be generated in the battery temperature regulating device. The cooling cycle may be employed to prevent the battery temperature from reaching or exceeding a maximum operating temperature. For example, at a temperature above the maximum operating temperature, temporary or permanent damage to the battery may occur. If the battery temperature reaches or exceeds the maximum operating temperature the process may shut down one or more, or even all of the electrochemical cells in the battery temperature regulating device.

As described above, the battery temperature regulating device includes one or more thermal energy storage material. Preferably the thermal energy storage material has a transition temperature (e.g., a melting temperature, a liquidus temperature, or a eutectic temperature) in the target temperature range. As such, the thermal energy storage material may be employed to maintain the battery temperature within the target temperature range (i.e., at or near the transition temperature). Optionally the battery temperature regulating device may include a first thermal energy storage material having a relatively high transition temperature (e.g. at the maximum target temperature, or below the maximum target temperature) and a second thermal energy storage material having a transition temperature lower than the first thermal energy storage material. For example, the first thermal energy storage material may have a transition temperature at or below the maximum target temperature and the second thermal energy storage material may have a transition temperature at or above the minimum target temperature.

The thermal energy storage material may advantageously be employed to remove thermal energy from an electrochemical cell when the electrochemical cell is generating heat (e.g., when the electrochemical cell is being charging or discharging electricity). During operation of an electrochemical cell, the battery temperature may initially be within the target temperature range and below the transition temperature of the thermal energy storage material (e.g., the first thermal energy storage material). As the electrochemical cell generates heat, the thermal energy may be partially used to heat the thermal energy storage material. When the thermal energy storage material reaches its transition temperature, some of the thermal energy may be used to melt the thermal energy storage material. As such, some of the thermal energy may be converted to the latent heat of fusion of the thermal energy storage material. The rate at which the battery temperature increases may be reduced (e.g., as compared to an identical device without thermal energy storage material) as thermal energy is converted to latent heat of fusion. When some or all of the thermal energy storage material (e.g., the first thermal energy storage material) has melted, the battery temperature may reach the maximum target temperature. By converting thermal energy to latent heat of fusion (i.e., by melting the thermal energy storage material), the need for removing thermal energy from the battery temperature regulating device (e.g., using a heat transfer fluid) may be reduced, delayed, or both.

When the battery temperature exceeds the maximum target temperature, a cooling cycle may be started including a step of starting to circulate the heat transfer fluid or increasing the rate at which the heat transfer fluid is circulated. During the cooling cycle, thermal energy from the battery may be transferred from the battery temperature regulating device to one or more components outside of the device having a temperature lower than the battery temperature. Without limitation, some or all of the thermal energy that is removed from the battery temperature regulating device during the cooling cycle may be transferred to a heat transfer device. Exemplary heat transfer devices that may be employed include a radiator, a thermal reservoir, a heat storage device (such as one described herein), or any combination thereof. Preferably some or all of the thermal energy that is removed from the battery temperature regulating device (e.g., during the cooling cycle) is used to heat the ambient air (e.g., through a radiator). During the cooling cycle, the cooling of the electrochemical cell may include a step of contacting the heat transfer fluid to an electrochemical cell compartment, to a thermal energy storage material compartment, or preferably both.

It will be appreciated that the ambient temperature may be below the target minimum temperature. During a period of time when the one or more electrochemical cells are not discharging or charging, or the average amount of charging and discharging is relatively low, thermal energy from the battery temperature regulating device may be lost to the environment. By employing a thermal energy storage material (e.g., a second thermal energy storage material) having a transition temperature at or above the minimum target temperature, the heat of crystallization of the thermal energy storage material may reduce the rate at which the battery temperature decreases (e.g., compared to a device without the thermal energy storage material).

When the battery temperature decreases to a temperature below the minimum target temperature, a heating cycle may be used to increase the battery temperature. During the heating cycle, thermal energy may be generated in the battery temperature regulating device, transferred to the device, or both. Preferably, during the heating cycle, thermal energy is transferred to the battery temperature regulating device. For example, thermal energy may be transferred to the battery temperature regulating device using a heat transfer fluid. As such, the heating cycle may include a step of starting the circulation of a heat transfer fluid through the battery temperature regulating device or increasing the rate of flow of a heat transfer fluid through the device. For example, the heat transfer fluid may flow through one or more components (e.g., one or more heat sources) having a temperature greater than the battery temperature (and preferably greater than the minimum target temperature) to heat the fluid and through the battery temperature regulating device to transfer at least some of the thermal energy into the device. The heat transfer fluid may remain the same phase (e.g., the heat transfer fluid may remain a liquid or a gas) and heat may be transferred as sensible heat, or the heat transfer fluid may be a working fluid and at least some of the heat may be transferred to the device as heat of condensation (and transferred from the heat source to the fluid as heat of vaporization). During the heating cycle, the heating of the electrochemical cell may include a step of contacting the heat transfer fluid to an electrochemical cell compartment, to a thermal energy storage material compartment, or preferably both.

The heat transfer fluid for the cooling cycle and the heat transfer fluid for the heating cycle may be the same, and may circulate through the same portion of the battery temperature regulating device. As such, one or more valves may be employed during the heating cycle for circulating the heat transfer fluid through a heat source, for preventing circulation of the heat transfer fluid through the heat transfer device, or preferably both. Similarly the one or more valves may be employed during the cooling cycle for preventing circulation of the heat transfer fluid through a heat source, for circulating the heat transfer fluid through a heat transfer device, or preferably both.

Optionally, the battery temperature regulating system may be employed in a vehicle that is plugged into a source of electricity outside of the vehicle when the vehicle is parked. When the vehicle is parked, an electric heater may be employed to heat the thermal energy storage material in the system. For example, when some or all of the thermal energy storage material has cooled, an electric heater may be employed to increase the temperature of the thermal energy storage material. The process may include a step of heating the thermal energy storage material (e.g., the thermal energy storage material in a battery temperature regulating device, in a heat storage device, or both) in a vehicle with an electric heater that receives electricity from a power source external to the vehicle. The step of heating the thermal energy storage material using an electric heater may be employed when some or all of the thermal energy storage material has undergone a phase transition from a liquid to a solid. As such, the process may include a step of melting some or all of the thermal energy storage material with heat from the electric heater. The step of heating the thermal energy storage material using an electric heater may be employed when all of the thermal energy storage material is in the liquid state. As such, the process may include a step of increasing the temperature of the thermal energy storage material using an electric heater.

It will be appreciated that the devices, systems, and processes of the present invention may be useful in automotive applications that employ a battery, and particularly automotive applications that have a drive train that receives power from an electric engine. Without limitation, the invention may be employed in hybrid electric vehicles and in plug-in electric vehicles.

With reference to FIG. 7, a temperature probe 56 may measure the temperature of the battery temperature regulating device. The controller 52 may compare the temperature of the battery temperature regulating device to a predetermined target temperature range. When the temperature is within the predetermined target temperature range, the controller 52 may stop the pump 62, reduce the pumping rate of the pump 62, close the valve 48, or any combination thereof. When the temperature of the battery temperature regulating device is near (e.g., increasing towards the maximum target temperature) or above the maximum target temperature, the controller may open the diverter valve 48 to a position that allows fluid to flow through the line 64 that feeds to the heat exchanger. The controller may also turn on the pump 62, or increase the speed of the pump 62 so that the heat transfer fluid circulates between the battery temperature regulating device 10 and the heat exchanger 58 using the lines 64, 66 connecting the two components. When the temperature of the battery temperature regulating device is near (e.g. decreasing towards the minimum target temperature) or below the minimum target temperature, the controller may obtain the temperature of the heat storage device 42, using a temperature probe 54 to determine whether the heat storage device is capable of heating the battery temperature regulating device. The temperature controller opens the diverter valve 48 to allow the heat transfer fluid to flow through the line 44 to the heat storage device 42. The controller may also turn on the pump 62, or increase the speed of the pump 62 so that the heat transfer fluid circulates between the battery temperature regulating device 10 and the heat storage device 42 using the lines 44, 46 connecting the two components.

What is claimed is:

1. A device comprising:
   a. an inlet for receiving a heat transfer fluid;
   b. one or more electrochemical cell compartments for receiving one or more electrochemical cells;
   c. one or more thermal energy storage material compartments containing one or more thermal energy storage materials; and
   d. one or more heat transfer fluid compartments for flowing the heat transfer fluid through the device;
   wherein the device is a temperature regulating device,
   the space between the one or more heat transfer fluid compartments and the one or more electrochemical cell compartments includes one or more regions that are substantially free of the thermal energy storage material; and
   the space between the one or more heat transfer fluid compartments and the one or more thermal energy storage material compartments includes one or more regions that are substantially free of an electrochemical cell;
   so that the heat transfer fluid compartment is in direct thermal communication with both the thermal energy storage material compartment and the electrochemical cell compartment such that the contact between the one or more heat transfer fluid compartments and the one or more thermal energy storage material compartments has an area $A_{TESM}$ and the contact between the one or more heat transfer fluid compartments and the one or more electrochemical cell compartments has an area $A_{EC}$ wherein the ratio of $A_{TESM}/(A_{TESM}+A_{EC})$ is greater than 0.1.

2. A device of claim 1 wherein the one or more electrochemical cell compartments includes an electrochemical cell having an operating temperature range, and the thermal energy storage material is a phase change material having a liquidus temperature in the operating temperature range of the electrochemical cell.

3. A device of claim 1, wherein the one or more thermal energy storage materials includes an amount of a first phase change material having a first liquidus temperature and an amount of a second phase change material having a second liquidus temperature, wherein the first liquidus temperature is lower than the second liquidus temperature.

4. A device of claim 1, wherein the device includes an electrochemical cell in an electrochemical cell compartment having a minimum target temperature and a maximum target temperature, wherein the device is capable of removing heat from an electrochemical cell compartment when the electrochemical cell has a temperature that is above the maximum target temperature, and is capable of providing heat to an electrochemical cell compartment when the electrochemical cell has a temperature that is below the minimum target temperature.

5. A device of claim 1 wherein the thermal energy storage material compartments includes a plurality of capsules formed by embossing a first metallic sheet to form a plurality of recesses, at least partially filling the recesses with the thermal energy storage material, positioning a second metallic sheet over the first metallic sheet, and joining the first metallic sheet and the second metallic sheet so that the thermal energy storage material is encapsulated between the first metallic sheet and the second metallic sheet.

6. A device of claim 1, wherein the first metallic sheet has an outer surface on the exterior of a thermal energy storage material compartment, wherein one or more portions of the outer surface contacts an electrochemical cell or a compartment containing an electrochemical cell and one or more portions of the outer surface contacts a compartment for containing a heat transfer fluid.

7. A device of claim 1, wherein thermal energy storage material compartment has a volume and a surface area, wherein the ratio of the volume to surface area is less than about 10 mm.

8. A device of claim 1, wherein the heat transfer fluid compartment has a volume and a surface area, wherein the ratio of the volume to surface area is less than about 0.5 mm.

9. A device of claim 1, wherein the one or more thermal energy storage material compartments includes a plurality of capsules that are individually isolated so that thermal energy storage material does not flow between two adjacent capsules.

10. A device of claim 1, wherein the first metallic sheet is an aluminum sheet or a copper sheet.

11. A device of claim 1, wherein the first metallic sheet has a thickness that is less than about 0.1 mm.

12. A system including:
    a. the temperature regulating device of claim 1;
    b. a heat storage device including an insulated container having an outlet, one or more thermal energy storage material compartments inside the insulated container and including a thermal energy storage material, and one or more heat transfer fluid compartments for flowing a heat transfer fluid through the heat storage device, wherein the heat transfer fluid compartment is in thermal communication with the thermal energy storage material compartment;
    c. a means for flowing a heat transfer fluid from the outlet of the heat storage device to the inlet to the temperature regulating device;
    wherein the system is a temperature regulating system for regulating the temperature of the one or more electrochemical cells.

13. The system of claim 12, wherein the system comprises a controller for controlling the flow of the heat transfer fluid from the heat storage device to the temperature regulating device.

14. The system of claim 12, wherein the system comprises one or more valves which are regulated by the controller.

15. The system of claim 14, wherein the controller controls one or more valves so that heat from the heat storage device is transferred to the one or more electrochemical cells at a condition that includes the electrochemical cell having a temperature that is below a predetermined minimum operating temperature.

16. A method for regulating the temperature of an electrochemical cell including a step of transferring heat into the battery temperature regulating device of claim 1 using a heat transfer fluid.

17. The method of claim 16, wherein the method further comprises a step of transferring heat from the temperature regulating device using the heat transfer fluid.